(12) United States Patent
Takemoto et al.

(10) Patent No.: US 8,922,698 B2
(45) Date of Patent: Dec. 30, 2014

(54) IMAGE PICKUP APPARATUS WITH REMOVABLE ND FILTER

(75) Inventors: Shoichi Takemoto, Utsunomiya (JP);
Yutaka Iriyama, Utsunomiya (JP);
Ryuji Ohmuro, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 212 days.

(21) Appl. No.: 13/445,994

(22) Filed: Apr. 13, 2012

(65) Prior Publication Data

US 2012/0262624 A1  Oct. 18, 2012

(30) Foreign Application Priority Data

Apr. 14, 2011 (JP) ................. 2011-089688
Apr. 14, 2011 (JP) ................. 2011-089692

(51) Int. Cl.
| H04N 5/225 | (2006.01) |
| G02B 13/16 | (2006.01) |
| G03B 17/14 | (2006.01) |
| G03B 11/00 | (2006.01) |
| G02B 5/20 | (2006.01) |
| G02B 7/00 | (2006.01) |
| G02B 7/04 | (2006.01) |

(52) U.S. Cl.
CPC ........ *G03B 17/14* (2013.01); *G03B 2205/0092* (2013.01); *G03B 11/00* (2013.01); *G02B 5/205* (2013.01); *G02B 7/006* (2013.01); *G02B 7/04* (2013.01)
USPC .......................................... 348/335; 348/360

(58) Field of Classification Search
CPC ...................................................... H04N 5/2254
USPC ..................................................... 348/335, 360
See application file for complete search history.

(56) References Cited

U.S. PATENT DOCUMENTS

| 4,825,235 A | * | 4/1989 | Wakabayashi et al. ......... 396/75 |
| 7,852,397 B2 | * | 12/2010 | Mochizuki et al. ........... 348/340 |
| 2003/0161049 A1 | | 8/2003 | Okada et al. |
| 2005/0225662 A1 | * | 10/2005 | Tsuda et al. .................. 348/360 |
| 2007/0248349 A1 | * | 10/2007 | Nanjo ........................... 396/241 |

(Continued)

FOREIGN PATENT DOCUMENTS

| EP | 1 840 639 A1 | 10/2007 |
| JP | 63025612 A | 2/1988 |

(Continued)

OTHER PUBLICATIONS

Partial European search report issued in Counterpart European Patent Application No. 12002534.1 dated Dec. 10, 2013.

(Continued)

*Primary Examiner* — Roberto Velez
*Assistant Examiner* — Cynthia Segura
(74) *Attorney, Agent, or Firm* — Rossi, Kimms & McDowell LLP

(57) ABSTRACT

An image pickup apparatus includes: a lens apparatus; and a camera apparatus that can be attached and removed from the lens apparatus, wherein the camera apparatus includes: an image pickup element; and an optical element configured to be inserted and removed from an optical path, the optical element is a ND filter, and the ND it has a surface with positive refractive power. A ratio of a thickness of the optical element on an optical axis and a thickness of the optical length adjustment unit on the optical axis is appropriately set.

19 Claims, 17 Drawing Sheets

(56) References Cited

U.S. PATENT DOCUMENTS

| | | | |
|---|---|---|---|
| 2008/0143868 A1* | 6/2008 | Tsuchiya et al. | 348/360 |
| 2009/0046199 A1 | 2/2009 | Nanjo | |
| 2009/0080098 A1* | 3/2009 | Okami | 359/888 |
| 2009/0201366 A1* | 8/2009 | Sase et al. | 348/79 |
| 2010/0259824 A1* | 10/2010 | Mitsuhashi et al. | 359/585 |

FOREIGN PATENT DOCUMENTS

| | | | |
|---|---|---|---|
| JP | 03267913 A * | 11/1991 | G02B 27/46 |
| JP | 09-98322 A | 4/1997 | |
| JP | 2002-189170 A | 7/2002 | |
| JP | 2006-74654 A | 3/2006 | |
| JP | 2009-081522 A | 4/2009 | |

OTHER PUBLICATIONS

Extended European Search Report for corresponding EP12002534.1, dated Jul. 30, 2014.

* cited by examiner

RANGE OF FOCUS DEPTH

IMAGE PICKUP APPARATUS WITH REMOVABLE ND FILTER

BACKGROUND OF THE INVENTION

1. Field of the Invention

The present invention relates to an image pickup apparatus, and particularly, to an image pickup apparatus that includes a lens apparatus and a camera apparatus including an optical element that can be attached and removed from the lens apparatus and that can be inserted and removed from an optical path.

2. Description of the Related Art

Conventionally, an image pickup apparatus is known in which refractive power is provided to an optical element inserted to an optical path to control a change in an image forming position caused by insertion and removal of the optical element.

For example, Japanese Patent Application Laid-Open No. S63-25612 discloses an invention in which an inserted optical element has refractive power to correct a change in the image forming position when the optical element is inserted. If a parallel-plate optical element is inserted between an image pickup lens and an image forming surface and into a lens system of the image pickup lens, the image forming position shifts to an over side (opposite side of an object side). Japanese Patent. Application Laid-Open No. S63-25612 provides positive refractive power to the inserted optical element to cancel a movement in the image forming position.

However, optical characteristics are changed by insertion and removal of the optical element in the conventional technique disclosed in Japanese Patent Application Laid-Open No. S63-25612. For example, if refractive power is provided to the optical element inserted to the optical path to cancel the shift in the image forming position as in Japanese Patent Application Laid-Open No. S63-25612, a spherical aberration to an under side occurs when the optical element is inserted. FIG. 17 illustrates a schematic diagram of the spherical aberration when the shift in the image forming position is canceled as in Japanese Patent Application Laid-Open No. S63-25612. In FIG. 17, an alternate long and short dash line 1502 denotes an aberration when the optical element is not inserted to the optical path. A chain line 1501 denotes an aberration when the optical element is inserted to the optical path, and IP denotes an image plane position. The spherical aberration degrades the quality of an obtained image. In addition, if a best focus position (1503, 1504), which can be expressed as a position with a minimum root mean square (RMS) of spot diameter in a spot diagram of axial beam, is not within a focal depth (1505, 1506), the insertion and removal of the optical element significantly affects the image, and the obtained image is greatly changed.

If the inserted optical element does not have positive refractive power as in Japanese Patent Application Laid-Open No. 563-25612 and is a parallel plate, the image forming position changes to the over side when the optical element is inserted, and a spherical aberration to the over side occurs. FIG. 18 illustrates a schematic diagram of the spherical aberration when the parallel plate is inserted. In FIG. 18, an alternate long and short dash line 1602 denotes an aberration when the optical element is not inserted to the optical path. A chain line 1601 denotes an aberration when the parallel-plate optical element is inserted to the optical path, and IP denotes an image plane position.

In FIG. 18, to set a paraxial focal point on the image plane relative to a paraxial beam, the paraxial focal point is adjusted by moving the lens unit in an optical axis direction or moving the image plane. As is clear from FIG. 18, of best focus positions 1603 and 1604, the best focus position 1603 when the optical element is inserted is not within the focal depth (1505, 1506), and it can be recognized that the spherical aberration causes a change in the image due to the insertion and removal. Particularly, the image significantly changes in an optical system with a small f-number.

SUMMARY OF THE INVENTION

An object of the present invention is to provide an image pickup apparatus that can suppress degradation of image quality even if a thick optical element (ND filter) is inserted and removed.

The present invention provides an image pickup apparatus including: a lens apparatus; and a camera apparatus that can be attached and removed from the lens apparatus, wherein the camera apparatus includes: an image pickup element; and an optical element configured to be inserted and removed from an optical path, the optical element is an ND filter, and the ND filter has a surface with positive refractive power.

Another embodiment of the present invention provides the image pickup apparatus, wherein the following condition is satisfied, $$0.5 < \frac{r}{R} < 1.5,$$

where r denotes a radius of curvature of the surface with the positive refractive power and R is defined by the following expressions, $$SA = \frac{d}{2} \times \frac{N^2 - 1}{N^3} \times \frac{1}{4 \times F^2 - 1}$$

$$H = \frac{K}{2 \times F}$$

$$A = \sqrt{(K + SA)^2 - H^2} - \sqrt{K^2 - H^2} - SA$$

$$B = \frac{A}{N - 1} \times 10$$

$$R = \frac{B^2 + H^2}{2 \times B}$$

where d denotes a thickness of the ND filter, N denotes a refractive index in a d-line of the ND filter, K denotes an air-equivalent length on the optical axis from the image plane of the image pickup element to the surface with the positive refractive power, and F denotes an f-number of the entire optical system of the image pickup apparatus.

The present invention can provide an image pickup apparatus that can suppress degradation in image quality even if a thick optical element (ND filter) is inserted and removed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

(First Aspect of the Invention)

Hereinafter, a first aspect of the present invention will be described in detail with reference to the attached drawings.

Figure 1A:
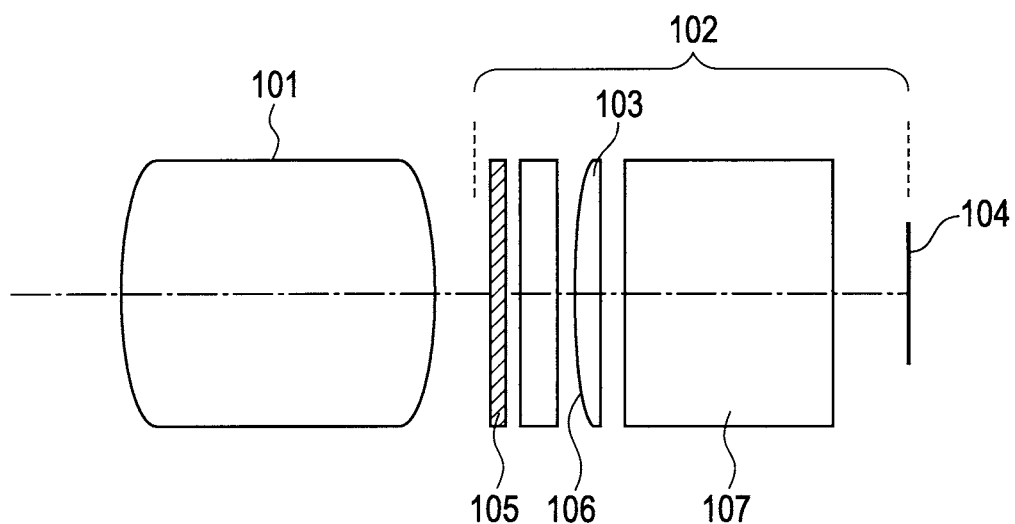
FIG. 1A is a schematic diagram of a configuration of an image pickup apparatus of a first aspect of the present invention (when an ND filter is inserted).
Figure 1B:
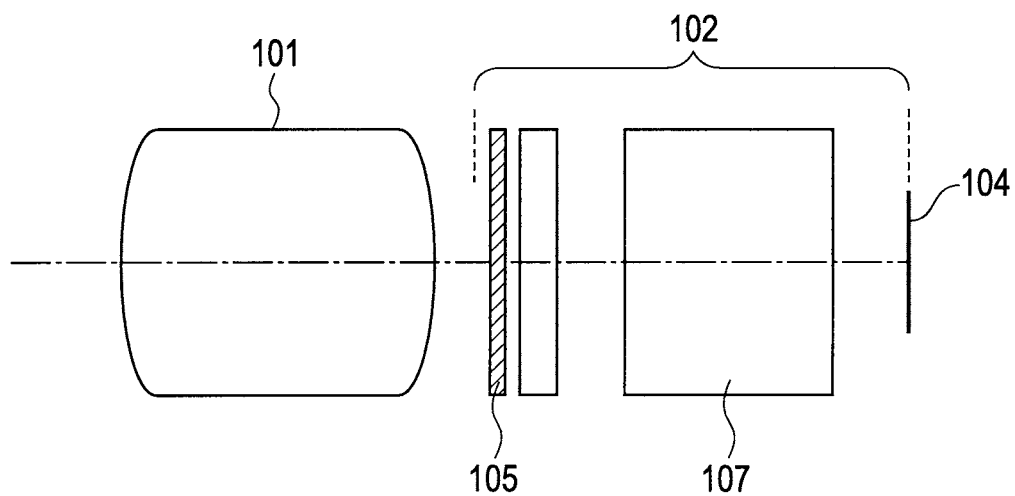
FIG. 1B is a schematic diagram of a configuration of the image pickup apparatus of the first aspect of the present invention (when the ND filter is removed).
Figure 19:
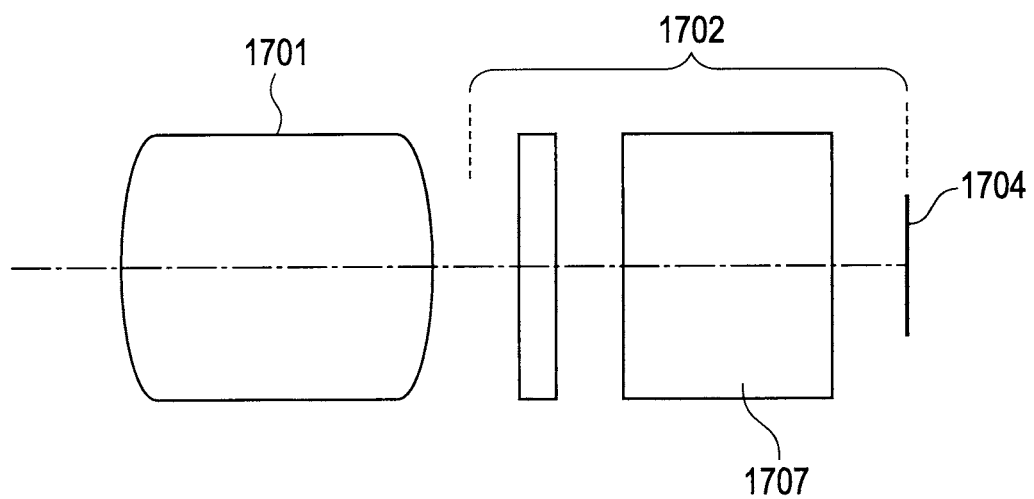
FIG. 19 is a schematic diagram of an optical system configuration when a camera optical system is in a normal state.

FIGS. 1A and 1B are schematic diagrams illustrating configurations of an image pickup apparatus as the first aspect of the present invention and are schematic configuration diagrams of the following first and second embodiments. The image pickup apparatus of the present invention includes a lens apparatus 101 and a camera apparatus that can be attached and removed from the lens apparatus. The camera apparatus includes an optical element 103 that can be inserted and removed from an optical path. FIG. 1A illustrates a configuration of a state in which the optical element 103 and an optical length adjustment unit 105 are inserted to the optical path. FIG. 1B illustrates a configuration of a state in which the optical element 103 is removed from the state of FIG. 1A. FIG. 19 illustrates a configuration of a case in which there is no optical element that can be inserted and removed, and the optical length adjustment unit 105 is not inserted to a camera optical system as an optical system of the camera apparatus (hereinafter, described as a case in which an optical length is in a normal state). The image pickup apparatus illustrated in FIGS. 1A, 1B, and 19 includes a replaceable image pickup lens 101 (1701), a camera optical system (for example, a color separating optical system 107 (1707), such as a Phillips-type dichroic prism, and a special effect filter) 102 (1702), and an image pickup element 104 (1704). The optical element 103 inserted and removed from the camera optical system 102 is a neutral density filter (ND filter). In the first and second embodiments of the present invention, positive refractive power is provided to a surface 106 of the optical element 103 inserted and removed from the optical path in the camera optical system 102, and the optical length adjustment unit 105 is arranged to adjust the optical length of the camera optical system 102. The positive refractive power is provided to the inserted and removed optical element 103 to suppress a change in the image forming position caused by the insertion and removal of the element. The optical length adjustment unit 105 is inserted to make the optical length of the camera optical system 102 longer than that in the normal state. In this way, a spherical aberration farther to the over side compared to that in the normal state is generated to reduce the spherical aberration on the under side generated when the optical element 103 is inserted.

In general, the optical length of the camera optical system is set to an optical length corresponding to the design of the lens to bring the paraxial focal point of the lens in line with the image plane of the camera. The normal state of the optical length in the present specification denotes such a state.

Figure 2:
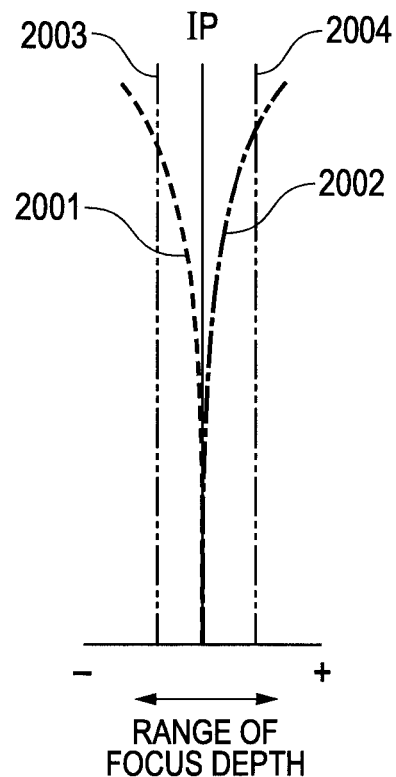
FIG. 2 is a schematic diagram of a longitudinal aberration when the ND filter is inserted and removed from an optical path.

FIG. 2 is a schematic diagram of a spherical aberration of a case in which the paraxial focal points when the optical element is inserted and removed are the same in the optical configuration of FIGS. 1A and 1B. A dashed line 2001 illustrates the spherical aberration when the optical element is inserted, and an alternate long and short dash line 2002 illustrates the spherical aberration when the optical element is removed. The optical length adjustment element 105 can be arranged in the optical path to generate a spherical aberration on the over side to reduce the change in the spherical aberration on the under side generated when the optical element is inserted. An alternate long and two short dashes line 2003 illustrates a best focus position when the optical element is inserted, and an alternate long and two short dashes line 2004 illustrates a best focus position when the optical element is removed. It is desirable to control the best focus position within the focal depth. This can suppress the influence on the image caused by the change in the spherical aberration. As described, the best focus position in the present specification denotes a position where an RMS spot diameter of a spot diagram of an axial beam is the smallest.

Figure 3:
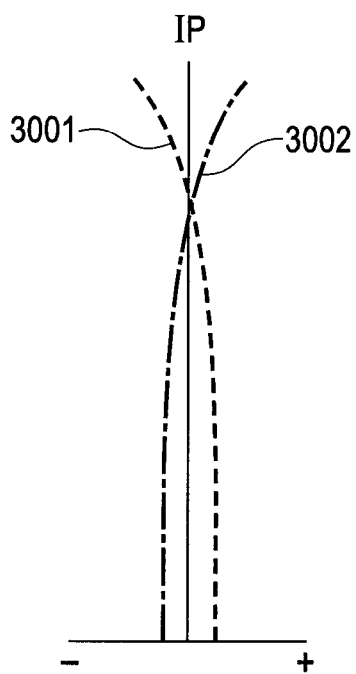
FIG. 3 is a schematic diagram of a longitudinal aberration when the ND filter is inserted and removed from the optical path according to the present invention.

FIG. 3 is a schematic diagram of a spherical aberration when the paraxial focal point is shifted to bring the best focus position in line with the image plane in the optical configuration of FIGS. 1A and 1B. A dashed line 3001 denotes a spherical aberration when the optical element is inserted, and an alternate long and short dash line 3002 denotes a spherical aberration when the optical element is removed. The spherical aberration when the optical element is removed is a spherical aberration to the over side as in the case of FIG. 2. However, the paraxial focal point is shifted to the under side of the image plane to bring the best focus position in line with the image plane to suppress the influence on the image caused by the spherical aberration when the optical element is removed. The paraxial focal point when the element is inserted is shifted to the over side of the image plane to bring the best focus position in line with the image plane to suppress the influence on the image caused by the spherical aberration when the element is inserted. The configuration can further suppress the influence on the image caused by the insertion and removal of the optical element. In general, if the inserted and removed glass is thick, the positive refractive power necessary to suppress the change in the image forming position increases, and the amount of the spherical aberration increases. Therefore, the image is more degraded due to the insertion and removal of the optical element. However, the configuration of the present invention can bring the image plane and the best focus position in line when the optical element is inserted and removed. This can reduce restrictions on the thickness of the inserted and removed optical element without degrading the image.

Figure 4A:
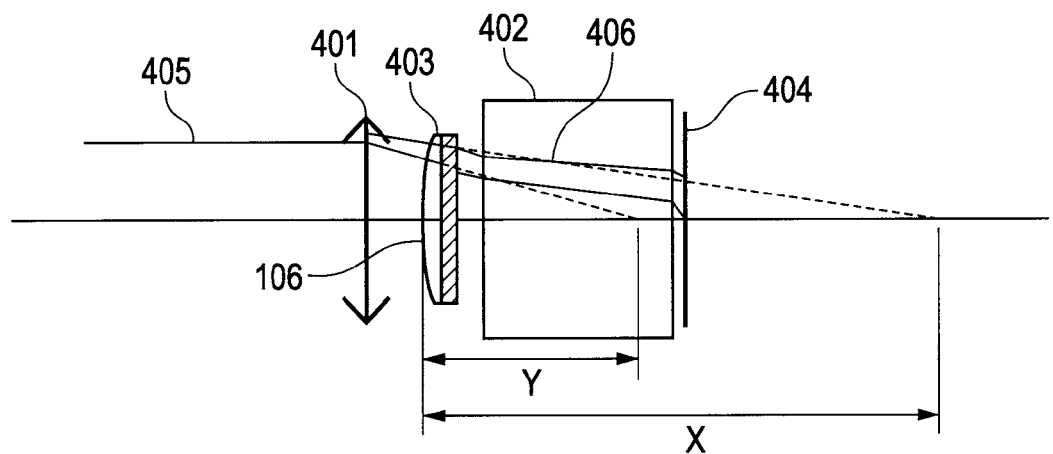
FIG. 4A is a schematic diagram of a relationship between an apparent exit pupil position and an apparent image plane.
Figure 4B:
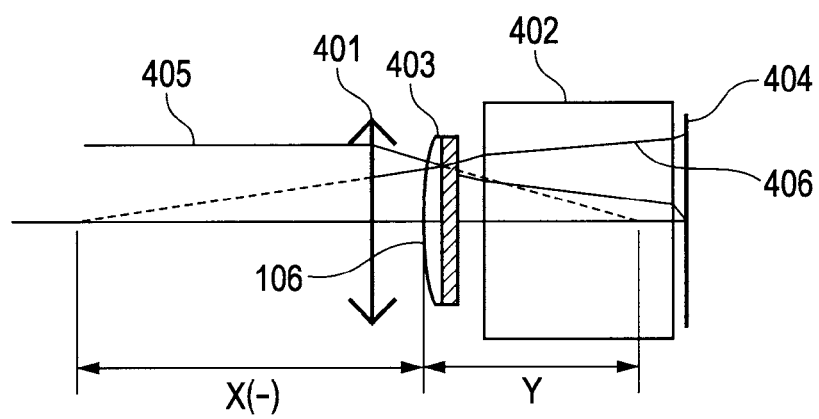
FIG. 4B is a schematic diagram of a relationship between an apparent exit pupil position and an apparent image plane.
Figure 4C:
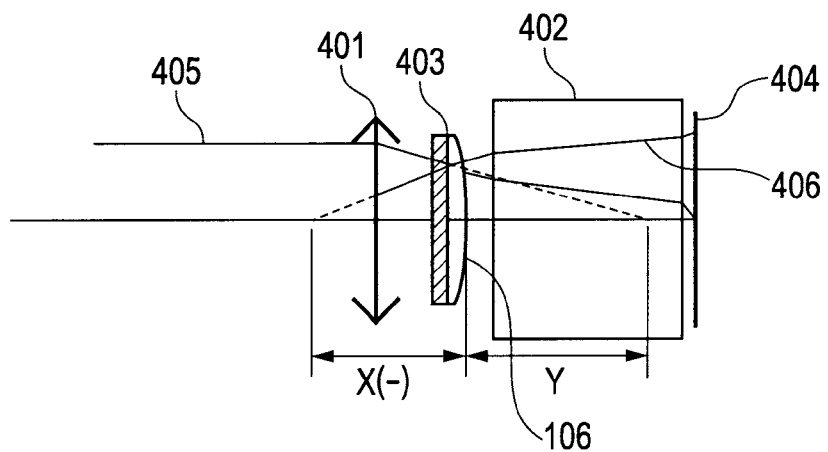
FIG. 4C is a schematic diagram of a relationship between an apparent exit pupil position and an apparent image plane.

On which of the surface on the object side of the optical element and the surface on the image pickup element side a convex surface (surface with positive refractive power) that is formed on the optical element inserted and removed from the camera optical system and that is for correcting the spherical aberration will be formed will be considered with reference to FIGS. 4A to 4C. FIGS. 4A to 4C are schematic diagrams illustrating relationships between a distance X on the optical axis from the surface 106 with positive refractive power to an apparent exit pupil position and a distance Y on the optical axis from the surface 106 to an apparent image plane in an optical system including an image pickup optical system 401, a camera optical system 402 in the image pickup camera, an optical element 403 that can be inserted and removed, and an image plane 404. In FIGS. 4A to 4C, 405 denotes a marginal ray of axial beam, and 406 denotes a principal ray of peripheral light. As for the signs of the distances X and Y, the image side of the surface with the curvature of the optical element 403 denotes positive, and the object side denotes negative.

FIG. 4A illustrates a case in which both the apparent image plane and the apparent exit pupil position are on the image side of the optical element (X/Y≥0). When the convex surface of the optical element faces the object side, the incident angles of the axial beam and the off-axial ray to the convex surface are smaller than when the convex surface faces the image side. Therefore, the aberration can be reduced. As a result, when X/Y≥0, it is desirable to form the convex surface on the surface of the object side of the optical element.

FIG. 4B illustrates a case in which the apparent image plane is on the image side of the optical element, and the apparent exit pupil is on the object side (X/Y<0), wherein |X|≥|Y|. In this case, when the convex surface of the optical element faces the object side, the incident angle of the axial beam to the convex surface can be reduced compared to when the convex surface faces the image side. Although the incident angle of the off-axial ray is a little too large, the influence is small because the exit pupil position is sufficiently apart. Therefore, if X/Y<0 and |X|≥|Y|, the convex surface can be formed on the surface of the object side of the optical element to reduce the aberration.

FIG. 4C illustrates a case in which the apparent image plane is on the image side of the optical element, and the apparent exit pupil is on the object side (X/Y<0), wherein |X|<|Y|. In this case, when the convex surface of the optical element faces the image side, the incident angle of the off-axial ray to the convex surface can be reduced compared to when the convex surface faces the object side. Although the incident angle of the axial beam is a little too large, the influence is small because the image plane is sufficiently apart. Therefore, if X/Y<0 and |X|<|Y|, the convex surface can be formed on the surface of the image side of the optical element to reduce the aberration.

In a case of an image pickup apparatus of lens-interchangeable type, the conditions can be taken into account to optimize the apparatus in accordance with the specifications of the interchangeable lens to suppress the degradation in the image quality caused by the insertion and removal of the optical element. The surface provided with the curvature is determined in this way in the optical element inserted and removed from the camera optical system in the present invention.

<First Embodiment>

Hereinafter, the image pickup apparatus according to a first embodiment of the present invention will be described with reference to FIGS. 5, 6A, and 6B.

Figure 5:
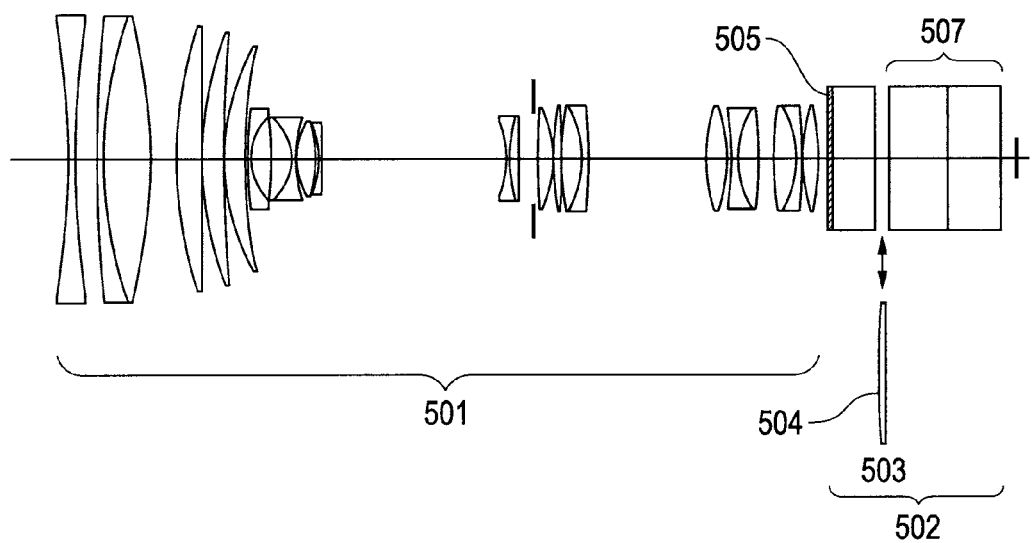
FIG. 5 is a lens cross-sectional view of a first embodiment (first aspect).

FIG. 5 is a lens cross-sectional view of the first embodiment. A camera optical system 502 formed in the image pickup camera is arranged on the image plane side of the zoom lens 501. The camera optical system 502 includes a color separating optical system 507 and an optical characteristic conversion filter such as an ND filter and a CC filter. An optical element (ND filter) 503 that can be inserted and removed is arranged in the camera optical system. A surface 504 on the object side of the optical element 503 is a convex surface to have positive refractive power and is designed not to change the paraxial focal point due to insertion and removal of the optical element 503. A parallel plate 505 with a refractive index of 1.603 and a thickness of 1.8 mm is arranged as an optical length adjustment unit in the camera optical system, and the optical length of the camera optical system is 1.8 mm longer than that in the normal state. As a result, a spherical aberration to the over side occurs when the optical element 503 is removed, compared to the normal state. Therefore, the spherical aberration to the under side when the optical element 503 is inserted can be suppressed, and the change in the spherical aberration caused by the insertion and removal of the optical element 503 is reduced.

Although the optical length adjustment unit 505 is arranged as a parallel plate in the present embodiment, the same advantageous effect can be obtained by attaching a thick film to the camera optical system or replacing the glass of the camera optical system with a glass with a long optical length.

Assuming that D1 denotes a thickness of the optical element 503 in the optical axis and that D2 denotes a thickness of the optical length adjustment unit 505 on the optical axis, the ratio of the thicknesses D1 and D2 in the present embodiment is D1/D2=0.9.

It is suitable if D1/D2 satisfies the following conditional expression (1).

$$0.6 < D1/D2 < 1.3 \quad (1)$$

If the upper limit of the conditional expression (1) is not satisfied, the change in the spherical aberration when the optical element 503 is inserted cannot be suppressed. The best focus when the optical element 503 is inserted becomes under the focal depth, and the image quality is degraded. The image significantly changes when the optical element 503 is inserted and removed, and this is not suitable.

Conversely, if the lower limit of the conditional expression (1) is not satisfied, the spherical aberration when the optical element 503 is removed excessively changes to the over side, and the best focus when the optical element 503 is removed becomes over the focal depth. The image quality is degraded, and this is not suitable.

It is further suitable if the conditional expression satisfies the following.

$$0.75 < D1/D2 < 1.05 \quad (1a)$$

A first numerical embodiment describes numerical data of the optical system of the present embodiment. FIG. 6A illustrates a longitudinal aberration when the optical element is removed in the optical system of the present embodiment. FIG. 6B illustrates a longitudinal aberration when the optical element is inserted. In graphs of astigmatism, A dashed line denotes a meridional plane, and a solid line denotes a sagittal plane. A lateral chromatic aberration illustrates an aberration relative to a g-line.

Figure 6A:
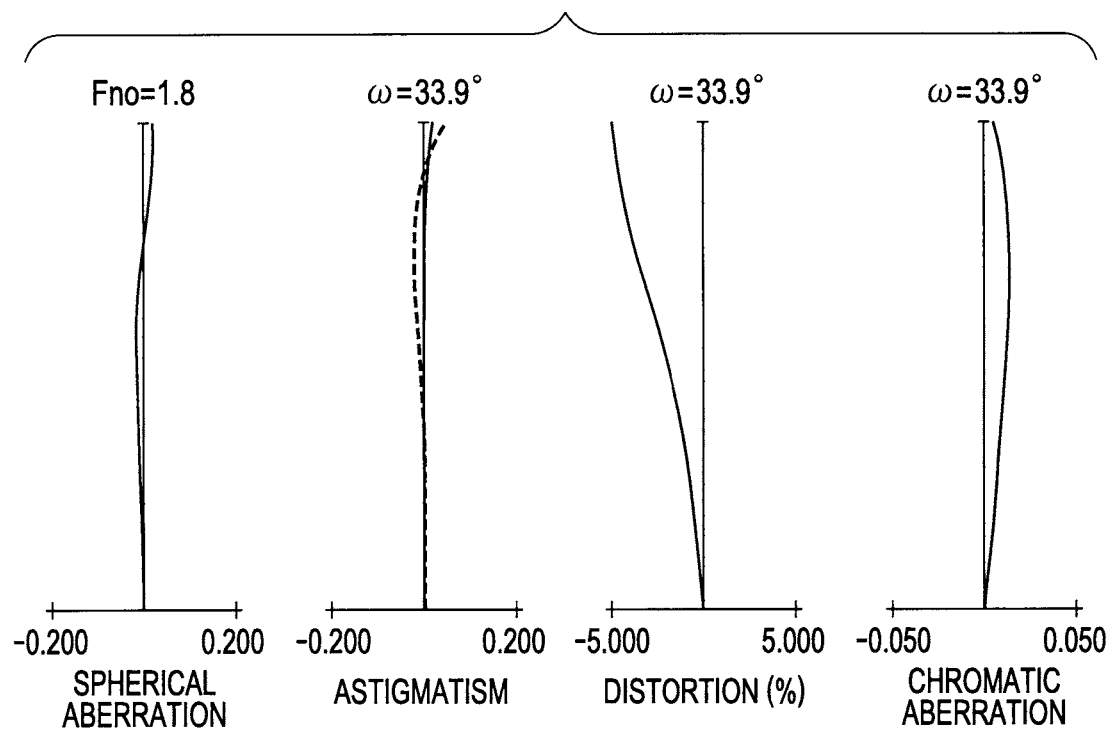
FIG. 6A illustrates a longitudinal aberration when the ND filter is removed according to the first embodiment (first aspect).

The optical length adjustment unit 505 causes the optical length of the camera optical system to be longer than that in the normal state, and a spherical aberration to the over side occurs when the optical element 503 is removed (FIG. 6A). However, the best focus position is within the focal depth, and the influence on the image is suppressed. Since there is no change in the paraxial focal point, the change in the best focus position is reduced by stopping down the aperture. Therefore, the influence on the image is further reduced.

In the embodiment, Table 1 illustrates that X/Y=(210.3/26.7)=7.9. Therefore, the convex surface of the inserted and removed optical element is formed on the surface facing the object side.

Figure 6B:
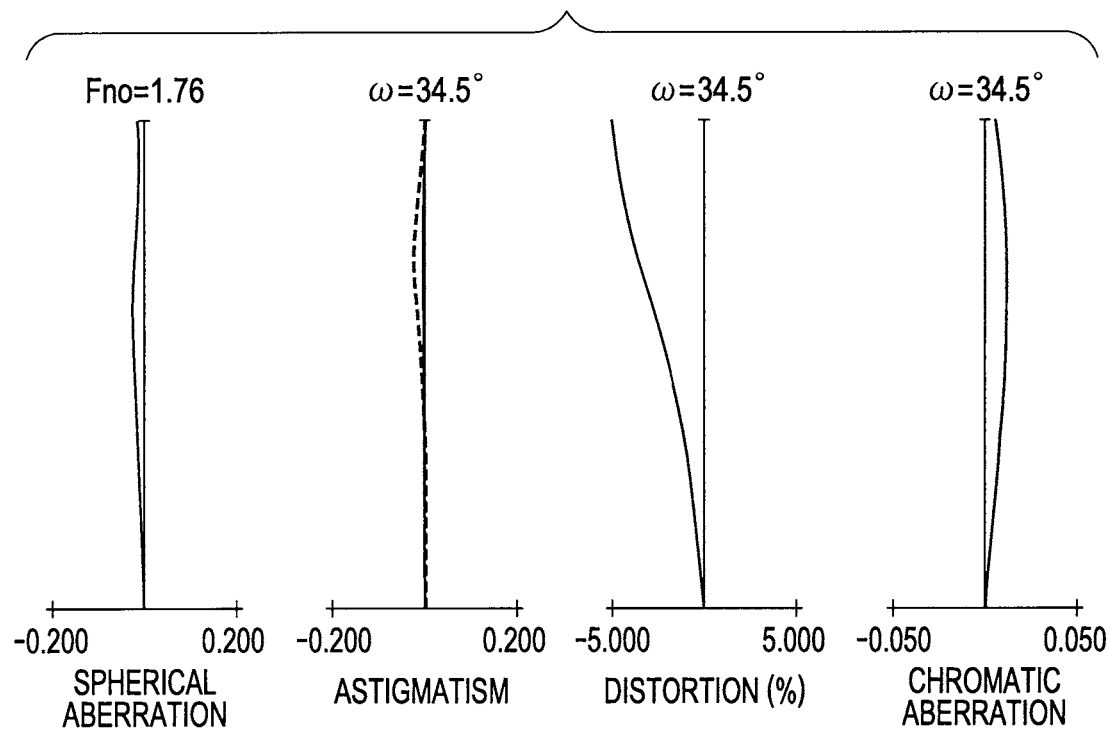
FIG. 6B illustrates a longitudinal aberration when the ND filter is inserted according to the first embodiment (first aspect).

FIG. 6B illustrates a longitudinal aberration when the optical element is inserted. Although there is a spherical aberration to the under side, the best focus position is within the focal depth as a result of adjusting the optical length in the camera optical system by the optical length adjustment unit 505. Therefore, the influence on the image is suppressed.

<Second Embodiment>

Hereinafter, the image pickup apparatus according to a second embodiment of the present invention will be described with reference to FIGS. 7, 8A, and 8B.

Figure 7:
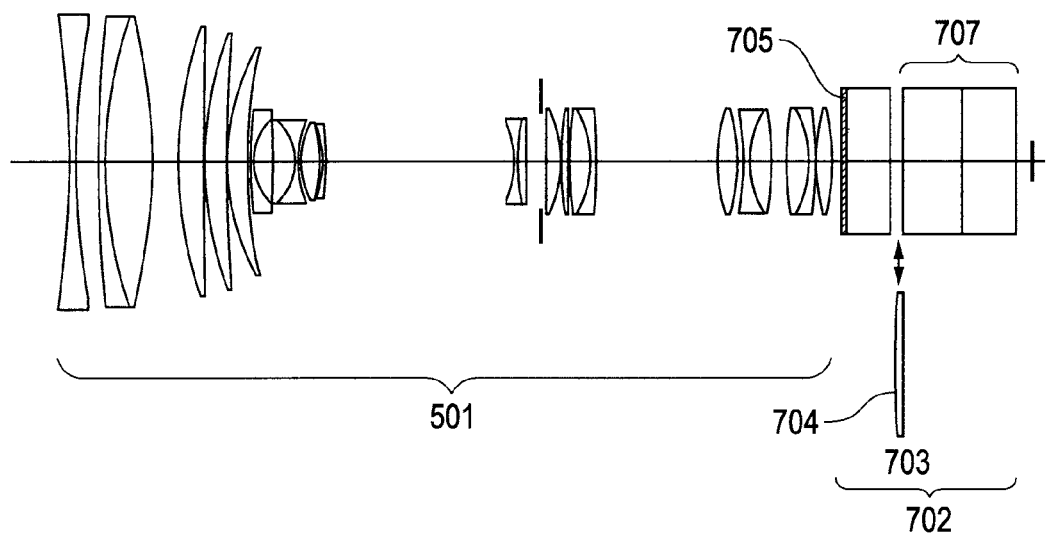
FIG. 7 is a lens cross-sectional view of a second embodiment (first aspect).
Figure 8A:
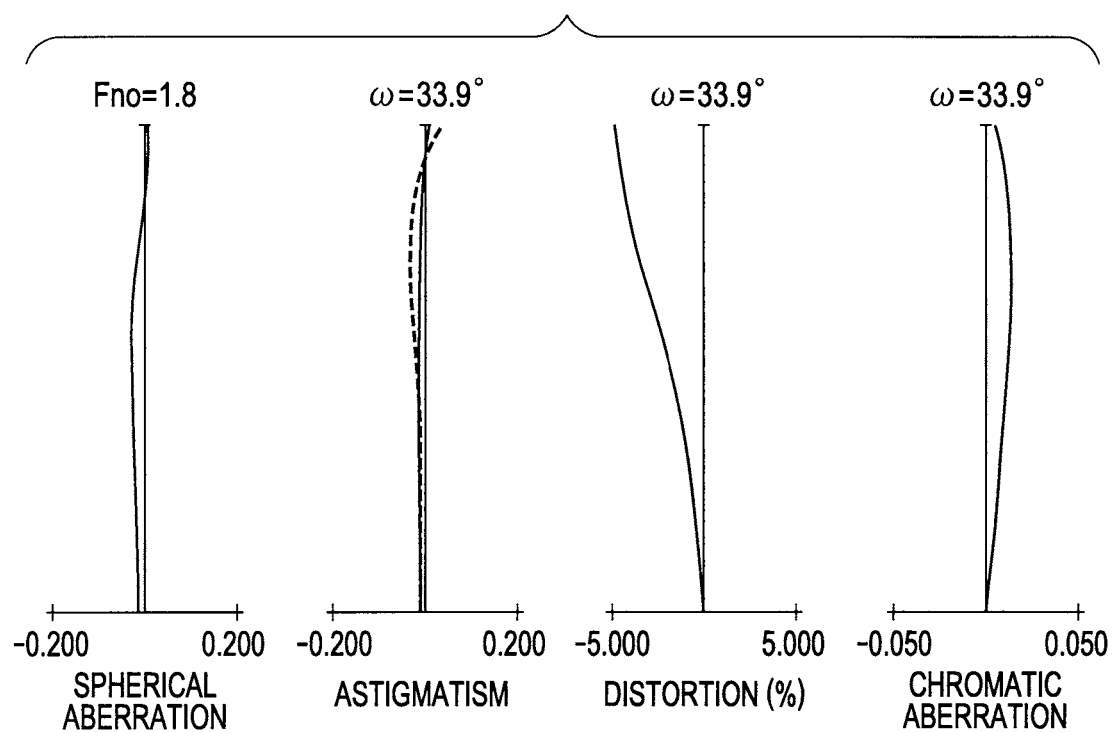
FIG. 8A illustrates a longitudinal aberration when the ND filter is removed according to the second embodiment (first aspect).

FIG. 7 is a lens cross-sectional view of the second embodiment. A camera optical system 702 formed in the image pickup camera is arranged on the image plane side of the zoom lens 501. The camera optical system 702 includes a color separating optical system 707 and an optical characteristic conversion filter such as an ND filter and a CC filter. An optical element 703 that can be inserted and removed is formed in the camera optical system. A surface 704 on the object side of the optical element 703 is a convex surface. In the present embodiment, the paraxial focal point when the optical element 703 is inserted is shifted to the over side relative to the image plane (to the opposite side of the subject) to bring the best focus position when the aperture is open in line with the image plane. The optical length adjustment unit 505 is arranged on the camera optical system, and the optical length of the camera optical system is 1.82 mm longer than that in the normal state. As a result, a spherical aberration to the over side occurs when the optical element 703 is removed, compared to the normal state. Therefore, a spherical aberration to the under side when the optical element 703 is inserted can be suppressed, and a change in the spherical aberration caused by the insertion and removal of the optical element is reduced. The paraxial focal point when the optical element is removed is shifted to the under side, and the best focus position when the aperture is open is brought in line with the image plane.

In the present embodiment, the ratio of the thickness D1 of the optical element 503 on the optical axis and the thickness D2 of the glass length adjustment unit on the optical axis is D1/D2=0.91, and the spherical aberration is excellently corrected.

Although the best focus position changes by stopping down the aperture, the focal depth deepens at the same time. Therefore, the influence on the image is small.

In the embodiment, X/Y=(211.3/26.7)=7.9. Therefore, the convex surface of the inserted and removed optical element is designed to face the object side. FIG. 8A illustrates a longitudinal aberration when the optical element is removed. A spherical aberration that a little toward the over side occurs due to the effect of the concave surface formed on the camera optical system. However, the paraxial focal point is shifted by 12.4 μm to the under side relative to the image plane, and the influence on the image is suppressed.

Figure 8B:
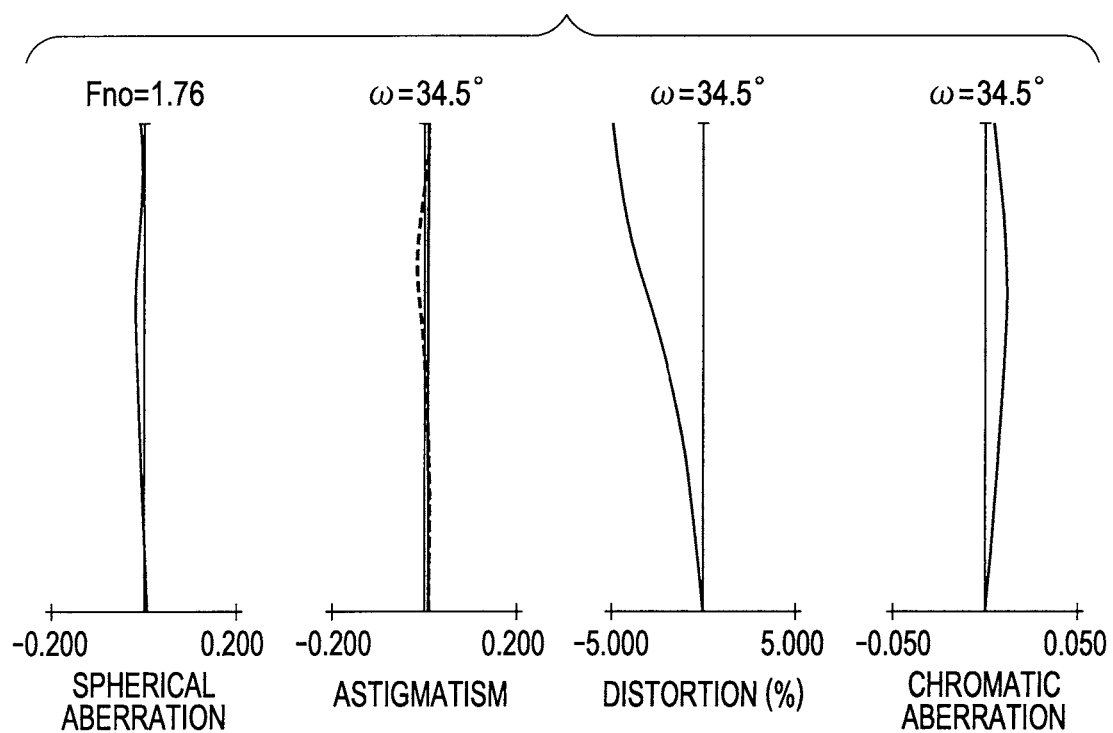
FIG. 8B illustrates a longitudinal aberration when the ND filter is inserted according to the second embodiment (first aspect).

FIG. 8B illustrates a longitudinal aberration when the optical element is inserted. Although a spherical aberration to the under side occurs, the spherical aberration is controlled as a result of the concave surface in the camera optical system. The paraxial focal point is shifted 7.0 μm to the over side relative to the image plane, and the best focus position is brought in line with the image plane. Therefore, the influence on the image is suppressed. The f-number of the image pickup lens and the axial aberration and the off-axial aberration of the entire optical system need to be taken into account to optimize the amount of shift from the paraxial focal point. For example, if the f-number decreases, the spherical aberration increases. Therefore, the amount of shift from the paraxial focal point needs to be large. Thus, an appropriate amount of shift can provide an image pickup apparatus without restrictions in the thickness of the inserted and removed optical element.

As described in the embodiment, under the imaging condition in which there is insertion and removal of an optical element such as a filter, the optical length adjustment unit that can be attached and removed can be included in advance in the optical system of the camera optical system to pickup an image without affecting the image quality due to the insertion and removal of the optical element during imaging. An optical length adjustment unit that can adjust optical characteristics in accordance with the optical characteristics of the used optical element may be selected and mounted. Under the imaging condition in which the optical element is not inserted to the optical path to pickup an image, the optical length adjustment unit can be removed in advance from the camera optical system to perform image-taking (with the camera optical system in the normal state) under conditions with excellent optical characteristics.

<Third Embodiment>

Figure 9A:
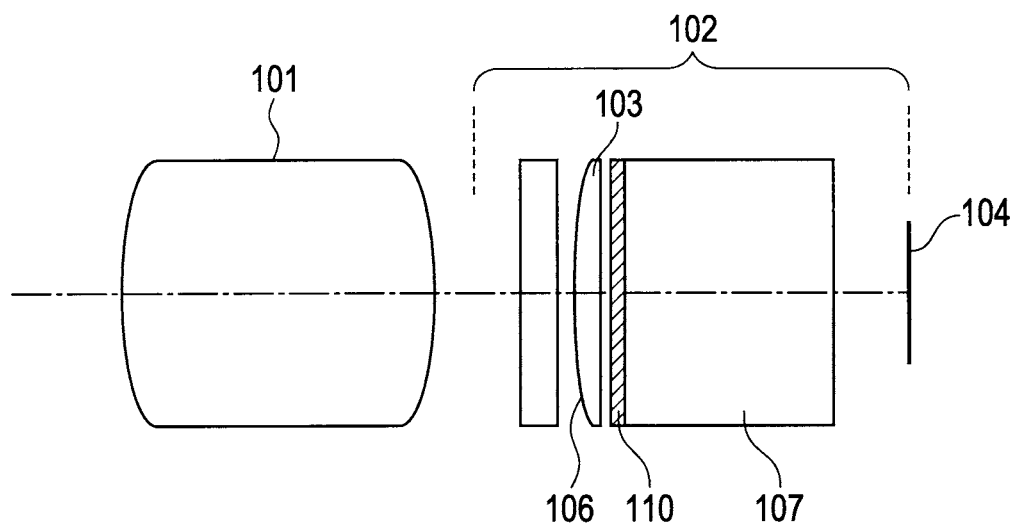
FIG. 9A is a schematic diagram of a configuration of an image pickup apparatus (when the ND filter is inserted) of the third embodiment (first aspect).
Figure 9B:
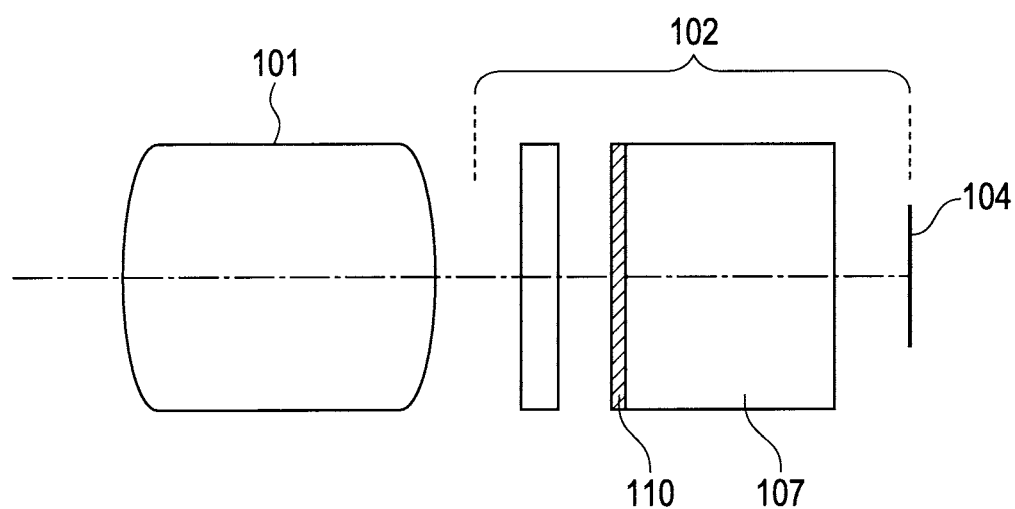
FIG. 9B is a schematic diagram of a configuration of the image pickup apparatus (when the ND filter is removed) of the third embodiment (first aspect).

FIGS. 9A and 9B are schematic diagrams illustrating configurations of the image pickup apparatus of a third embodiment according to the first aspect of the present invention. In FIGS. 9A and 9B, the difference from FIGS. 1A and 1B is that an optical length adjustment unit 110 is attached to the color separating optical system 107 (the optical length adjust unit 110 is arranged separately from the color separating optical system 107). In this case, the same advantageous effect as in FIGS. 1A and 1B can be obtained.

<Fourth Embodiment>

Figure 10A:
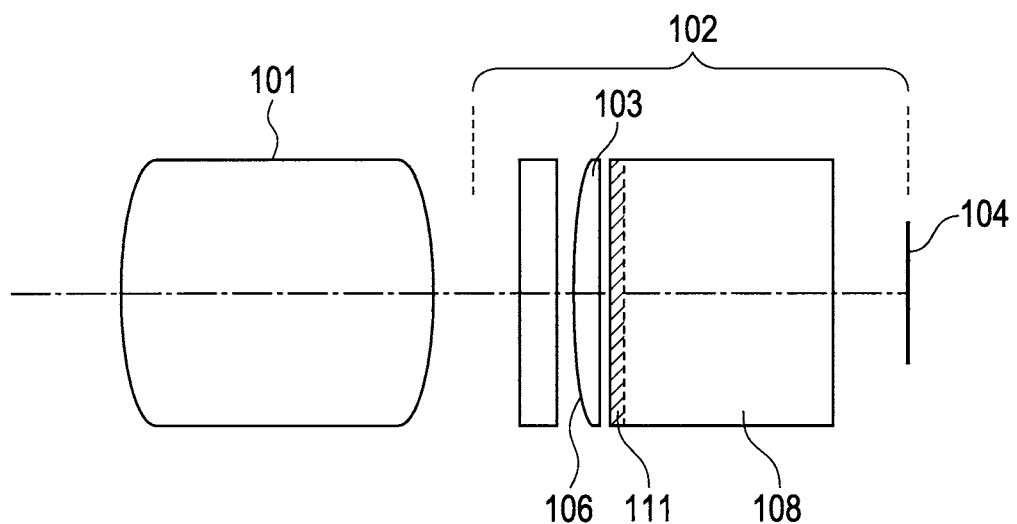
FIG. 10A is a schematic diagram of a configuration of the image pickup apparatus (when the ND filter is inserted) of the fourth embodiment (first aspect).
Figure 10B:
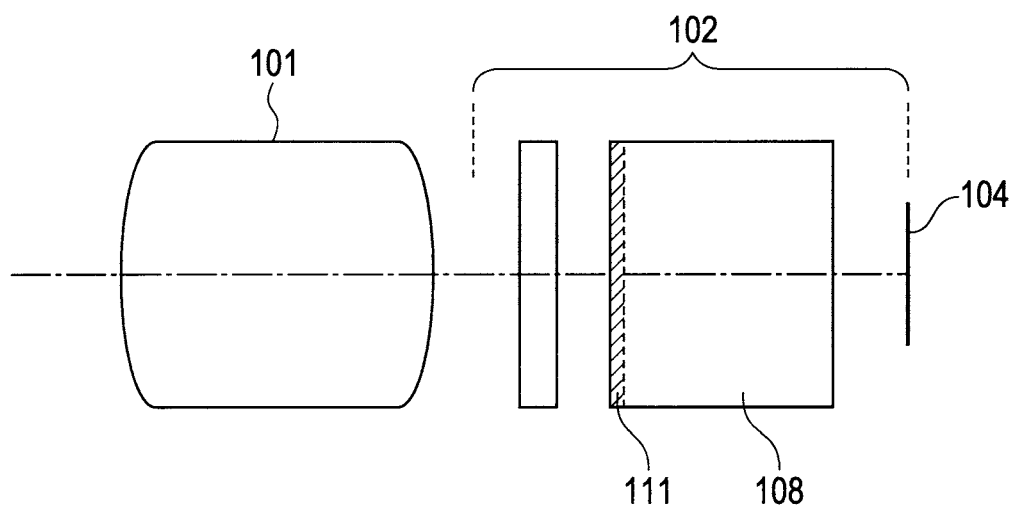
FIG. 10B is a schematic diagram of a configuration of the image pickup apparatus (when the ND filter is removed) of the fourth embodiment (first aspect).

FIGS. 10A and 10B are schematic diagrams illustrating configurations of the image pickup apparatus of a fourth embodiment according to the first aspect of the present invention. In FIGS. 10A and 10B, the difference from FIGS. 1A and 1B is that an optical length adjustment unit 111 is integrally provided with a color separating optical system 108. In this case, the same advantageous effect as in FIGS. 1A and 1B can be obtained. In the image pickup apparatus shown in FIGS. 10A and 10B, since the optical length adjustment unit 111 is integrally provided with the color separating optical system 108, the glass length of the camera optical system 102 is longer than that of standard glass length.

The glass length of a camera optical system is defined in, for example, a technical report provided by Association of Radio Industries and Businesses (hereinafter referred to as "ARIB") as "ARIB Technical Report BTA S-1005B: Interconnection for HDTV studio equipment (see http://www.arib.or.jp/english/html/overview/doc/4-BTA S-1005v B.pdf). According to the technical report, the standard glass length is defined as 46.2 mm±0.5 mm for an interface between a ⅔-inch camera and a lens and 69.0 mm±0.5 mm for an interface between a 1-inch camera and a lens. In addition, although not defined in "BTA S-1005B", the standard glass length is generally defined as 40.0 mm±0.5 mm for an interface between a ½-inch camera and a lens and 27.8 mm±0.5 mm for an interface between a ⅓-inch camera and a lens. In the case of the image pickup apparatus illustrated in FIGS. 10A and 10B, since the optical length adjustment unit 111 is integrally provided with the color separating optical system 108, the glass length of the camera optical system 102 is longer than the standard glass length. The standard glass length of the camera optical system is not necessarily coincident with the standard glass length defined by ARIB and can be the other standard glass length defined as an industry standard. In such case, the glass length of the camera optical system 102 is longer than the other standard glass length.

(Second Aspect of the Invention)

Figure 11:
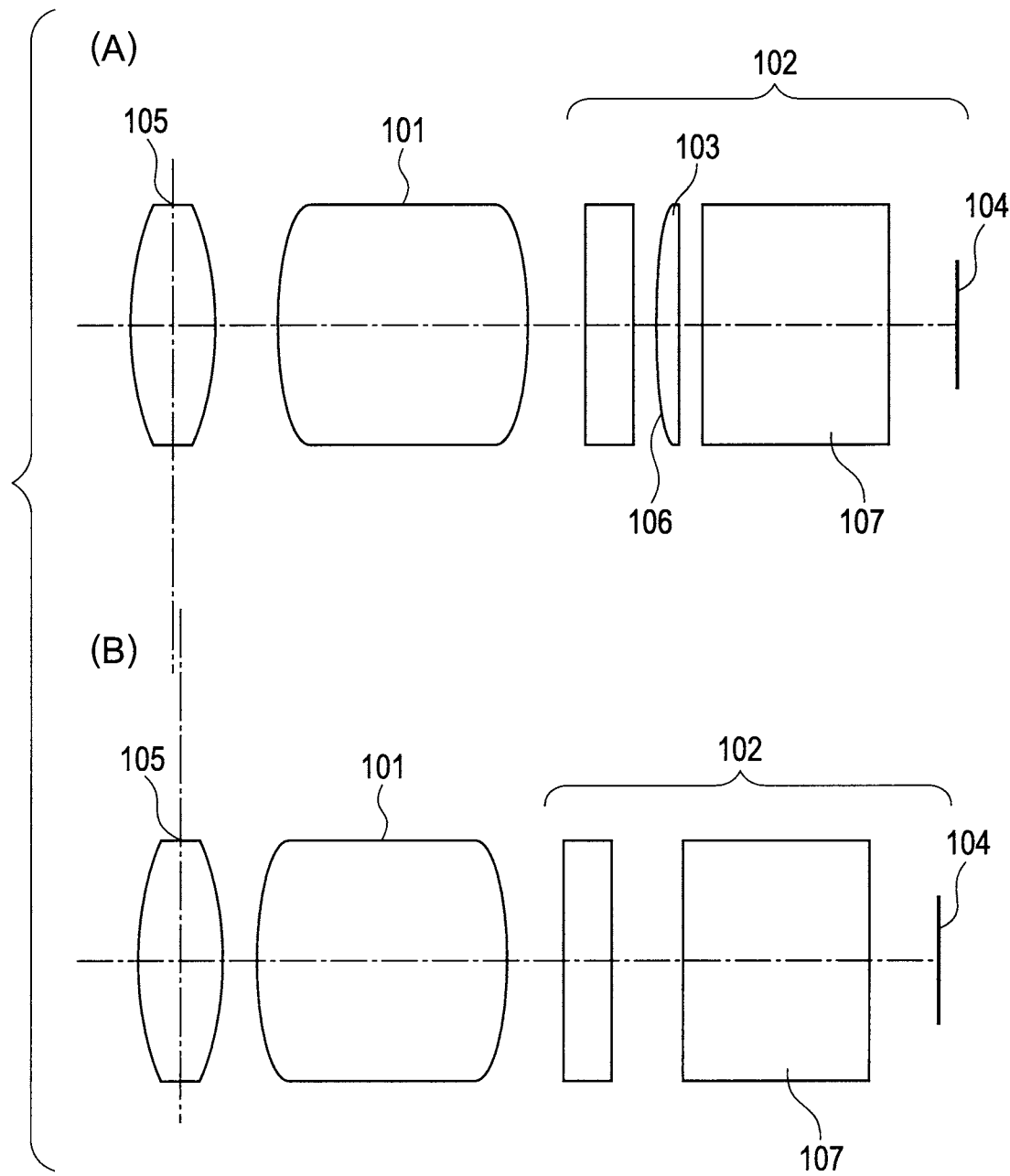
FIG. 11 is a schematic diagram of a configuration of the image pickup apparatus of the fifth embodiment (second aspect).
Figure 12:
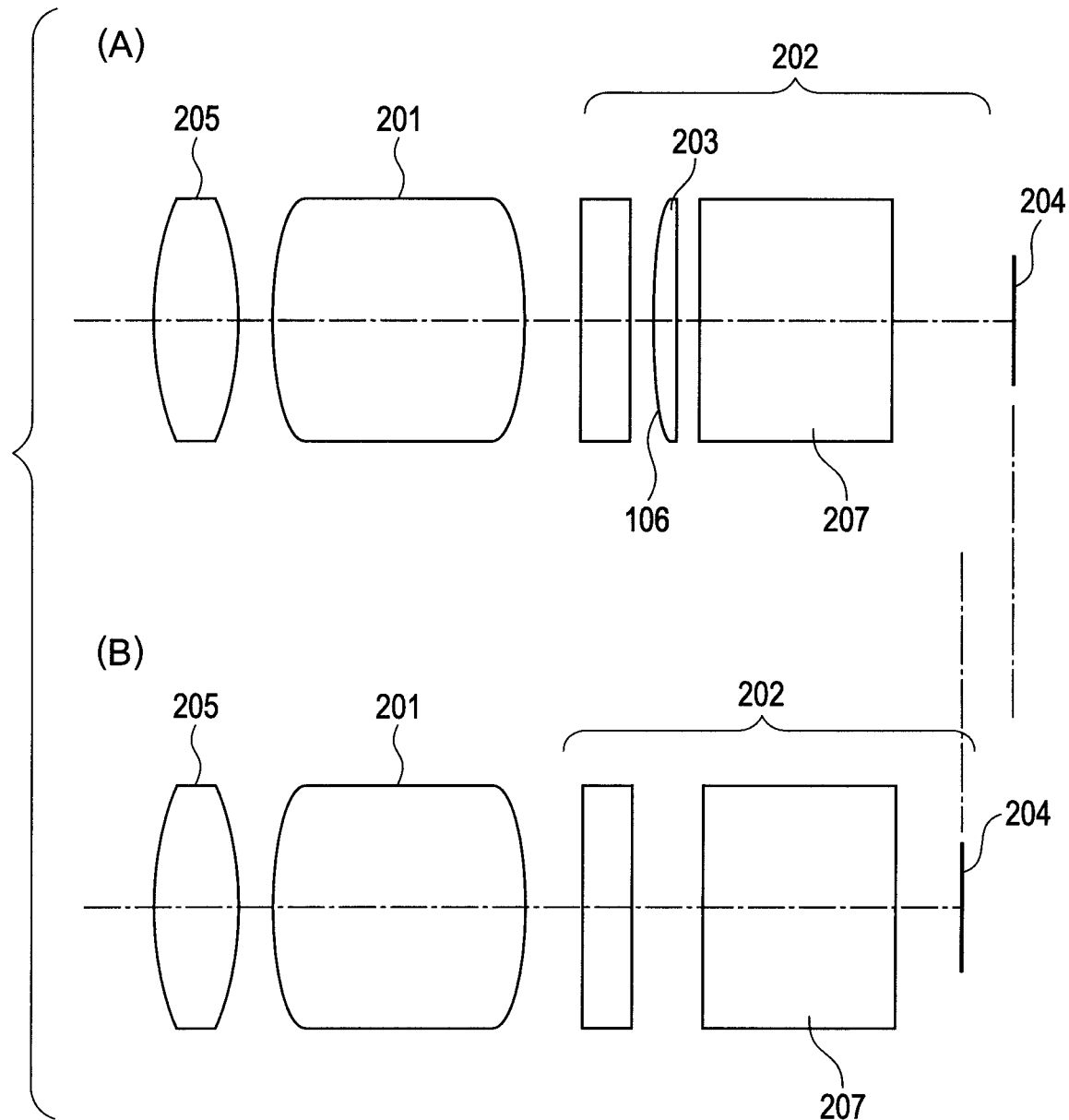
FIG. 12 is a schematic diagram of a configuration of the image pickup apparatus of the sixth embodiment (second aspect).

FIGS. 11 and 12 are schematic diagrams illustrating configurations of the image pickup apparatuses as the second aspect of the present invention and are configuration schematic diagrams of the image pickup apparatuses of the following embodiments 5 and 6. The image pickup apparatus of the present invention includes lens apparatuses (101 and 105) and a camera apparatus that can be attached and removed from the lens apparatuses.

The camera apparatus includes an optical element that can be inserted and removed from the optical path. (A) in FIG. 11 illustrates a configuration of a state in which the optical element 103 is inserted to the optical path, and (B) in FIG. 11 illustrates a configuration of a state in which the optical element 103 is removed. The image pickup apparatus of the present invention includes the interchangeable image pickup lenses 101 and 105, the camera optical system (such as the color separating optical system 107 and the special effect filter) 102, the image pickup element 104, and the inserted and removed optical element 103. The optical element 103 is a ND filter (ND filter). In the image pickup optical system of the present invention, the inserted and removed optical element 103 has positive refractive power, and a radius of curvature r that provides the positive refractive power satisfies the following conditional expression.

$$0.5 < \frac{r}{R} < 1.5 \quad (2)$$

In the conditional expression, R denotes a radius of curvature necessary to correct an amount of spherical aberration SA to be corrected in a third-order aberration theory, and R is obtained from the following expressions.

$$SA = \frac{d}{2} \times \frac{N^2 - 1}{N^3} \times \frac{1}{4 \times F^2 - 1} \quad (3)$$

$$H = \frac{K}{2 \times F} \quad (4)$$

$$A = \sqrt{(K + SA)^2 - H^2} - \sqrt{K^2 - H^2} - SA \quad (5)$$

$$B = \frac{A}{N - 1} \times 10 \quad (6)$$

$$R = \frac{B^2 + H^2}{2 \times B} \quad (7)$$

In the expressions, d denotes a thickness of the optical element, N denotes a refractive index relative to the d-line of the optical element, K denotes an air-equivalent length on the optical axis from the image plane of the image pickup element to the surface with the positive refractive power of the optical element, and F denotes an f-number of the entire optical system of the image pickup apparatus. Satisfying the conditional expressions can excellently correct the spherical aberration caused by the insertion of the optical element. It is further desirable if the following conditional expression is satisfied.

<Expression 1>

$$0.8 < \frac{r}{R} < 1.4 \quad (8)$$

Satisfying the conditional expression (2), and more suitably, the conditional expression (8), can excellently correct the spherical aberration particularly in an optical system with a small f-number (F<2.0).

The image pickup apparatus of the present invention further includes a unit of correcting the movement of the image forming position caused by the insertion and removal of the optical element 103 from the camera optical system. As illustrated in FIG. 11, the surface 106 of the inserted and removed optical element 103 has positive refractive power to suppress the spherical aberration caused by the insertion of the optical element. The optical system 105 is further arranged in the image pickup lens as an image position correction unit that corrects the movement in the image forming position caused by the insertion and removal of the optical element 103 (fifth embodiment describe later). The optical system 105 in the image pickup lens is shifted to the optical axis direction to correct the movement of the image forming position due to the insertion of the optical element 103.

FIG. 12 illustrates an embodiment in which a unit that corrects the movement of the image forming position caused by insertion and removal of the optical element 203 arranged on the object side of the color separating optical system 207 is included in a camera optical system 202 (sixth embodiment described later). In FIG. 12, the image pickup element 204 is moved in the optical axis direction to handle the movement of the image forming position caused by the insertion and removal of the optical element 203. The image position correction unit is not limited to the unit that moves the image pickup element. For example, the camera optical system may be designed to include a lens for correction. In this case, the correction lens is shifted in the optical axis direction in accordance with the insertion and removal of the optical element to correct the image forming position.

In the embodiments of the second aspect of the invention, on which of the surface of the optical element on the object side and the surface on the image pickup element the convex surface (surface with positive refractive power) that is formed on the optical element inserted and removed from the camera optical system and that is for correcting the spherical aberration will be formed is the same as in the embodiments of the first aspect of the invention (see FIGS. 4A to 4C).

<Fifth Embodiment>

The image pickup apparatus according to a fifth embodiment of the present invention will be described with reference to FIGS. 13A, 13B, 14A, and 14B.

Figure 13A:
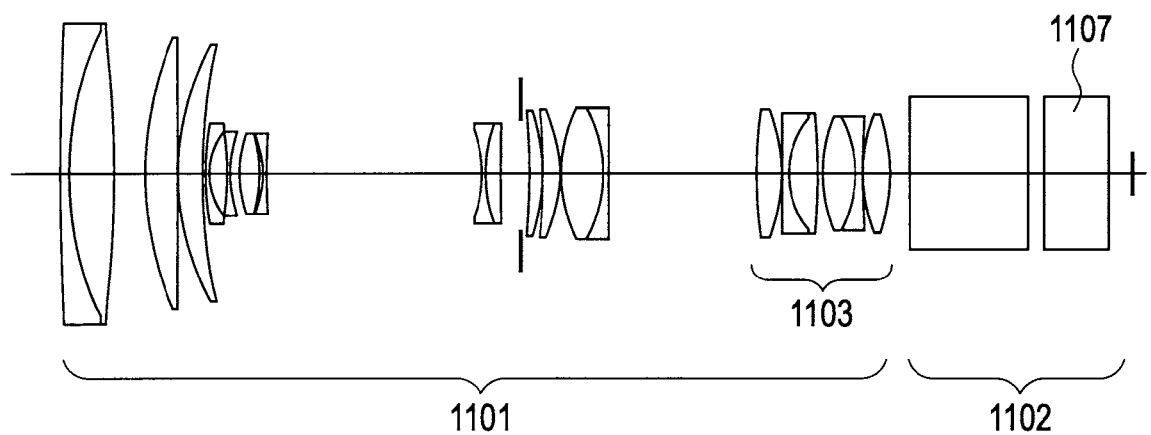
FIG. 13A is a lens cross-sectional view when the ND filter is removed according to the fifth embodiment (second aspect).
Figure 13B:
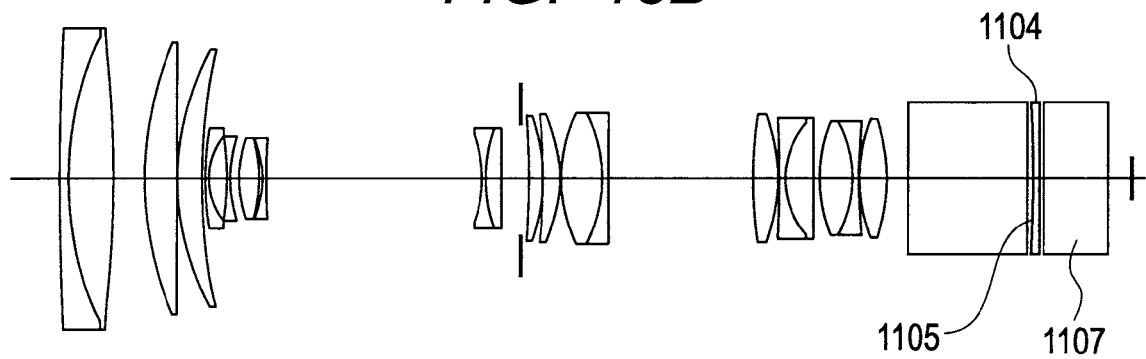
FIG. 13B is a lens cross-sectional view when the ND filter is inserted according to the second embodiment (second aspect).

FIGS. 13A and 13B are lens cross-sectional views of the fifth embodiment. A camera optical system 1102 formed in the image pickup camera is arranged on the image plane side of the zoom lens 1101. The camera optical system 1102 includes a color separating optical system 1107 and an optical characteristic conversion filter such as an ND filter and a CC filter. An optical element 1404 that can be inserted and removed is formed in the camera optical system. A surface 1105 of the optical element 1104 on the object side is a convex surface to have positive refractive power to prevent degradation in the spherical aberration caused by the insertion of the optical element 1104. The radius of curvature of the surface 1105 in the present embodiment is 700 mm, the thickness of the optical element 1104 is 2 mm, and the d-line refractive index N is 1.51633. The air-equivalent length X on the optical axis from the surface 1105 with the positive refractive power to the image plane is 19.01 mm, and the open f-number is 1.85.

Table 2 illustrates numerical values related to the expressions (2) to (8). It can be recognized that the conditional expression (2) is satisfied and that the conditional expression (8) is further satisfied. In addition, X/Y=11.4.

An image position correction unit 1103 that corrects the movement in the image forming position when the optical element is inserted is formed in the image pickup lens. The optical element 1103 is shifted by 0.41 mm to the object side when the optical element 1104 is inserted to the optical path. As a result, the change in the image forming position caused by the insertion of the optical element 1104 is suppressed. The present embodiment includes a control unit that detects the state of the optical element 1104 in accordance with the insertion and removal from the optical path to drive the image position correction unit in the image pickup lens apparatus. In this way, the image position can be corrected quickly in accordance with the insertion and removal of the optical element without the operator being conscious of the drive of the image position correction unit.

Since X/Y=11.4 in the present embodiment, the convex surface of the inserted and removed optical element is formed on the surface facing the object side.

Figure 14A:
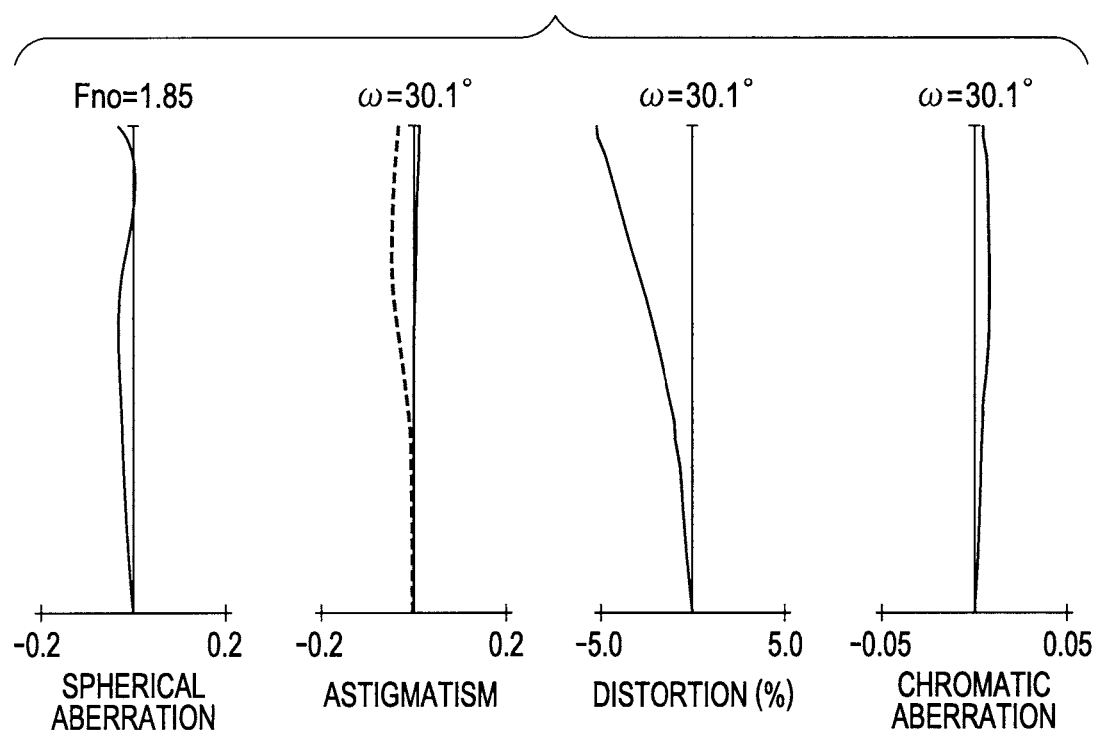
FIG. 14A illustrates a longitudinal aberration when the ND filter is removed according to the fifth embodiment (second aspect).
Figure 14B:
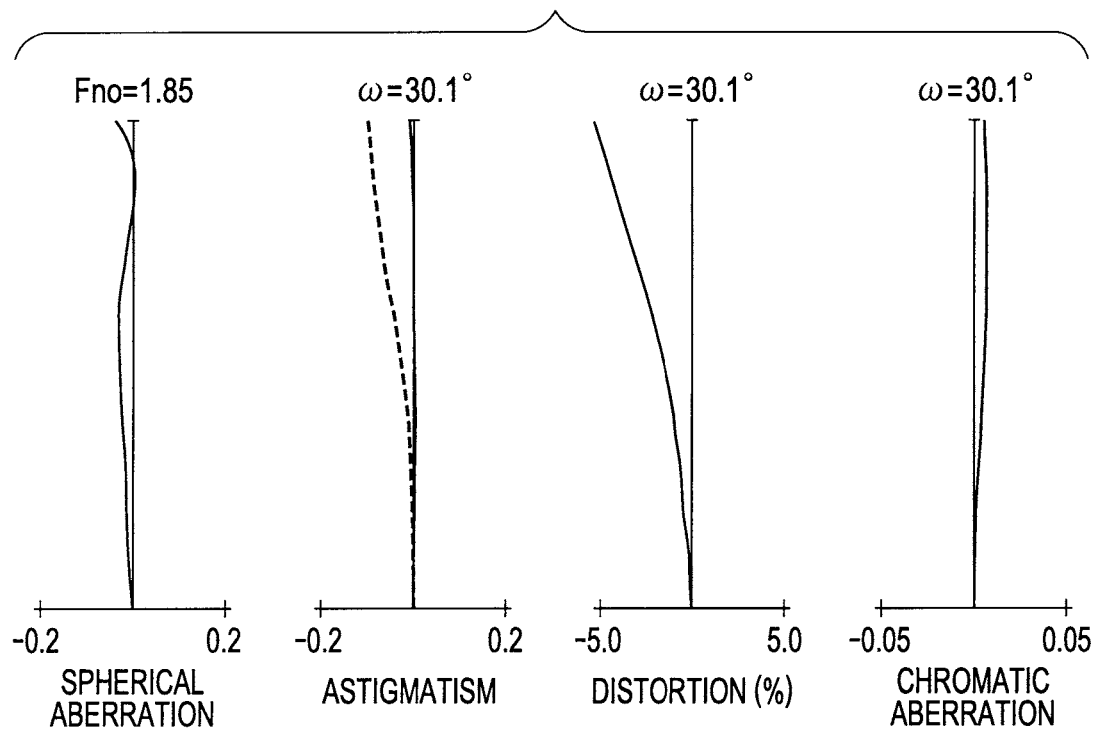
FIG. 14B illustrates a longitudinal aberration when the ND filter is inserted according to the fifth embodiment (second aspect).

A third numerical embodiment describes numerical data of the optical system of the fifth embodiment. FIG. 14A illustrates a longitudinal aberration when the optical element is removed in the optical system of the present embodiment. FIG. 14B illustrates a longitudinal aberration when the optical element is inserted in the optical system of the present embodiment. In the graphs of astigmatism, a solid line denotes a sagittal plane, and a dashed line denotes a meridional plane. A lateral chromatic aberration denotes an aberration relative to the g-line. Surfaces 39 and 40 in the optical data when the optical element is removed are described only to facilitate the comparison with the inserted and removed optical element when the optical element is inserted, and nothing exists at the positions of the surfaces 39 and 40. Therefore, air exists between surfaces 38 and 41, and an interval d is 4.0 mm.

The surface 1105 as the surface on the object side of the inserted optical element 1104 is formed by a convex surface to provide positive refractive power, and the radius of curvature satisfies the conditional expression (2) and further satisfies the conditional expression (8). In this way, the change in the spherical aberration caused by the insertion and removal of the optical element is suppressed.

<Sixth Embodiment>

The image pickup apparatus according to a sixth embodiment of the present invention will be described with reference to FIGS. 15A, 15B, 16A, and 16B.

Figure 15A:
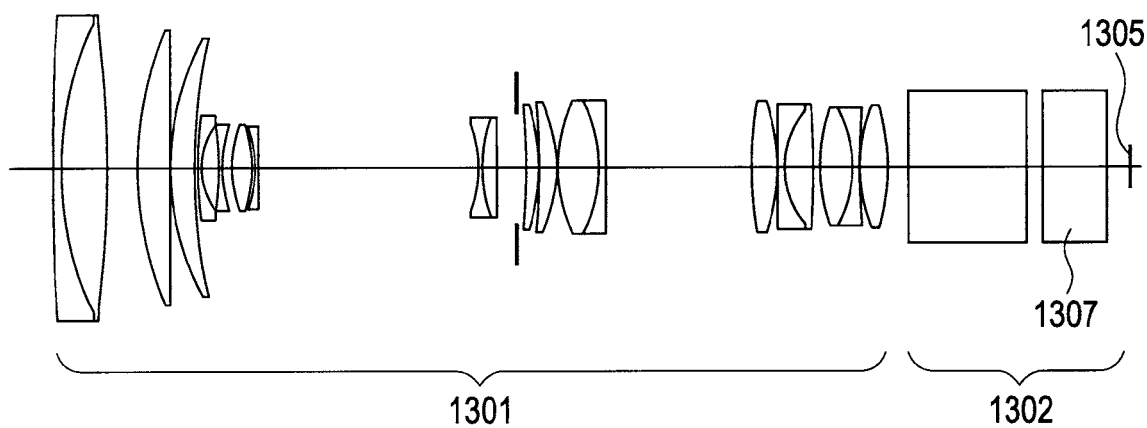
FIG. 15A is a lens cross-sectional view when the ND filter is removed according to the sixth embodiment (second aspect).
Figure 15B:
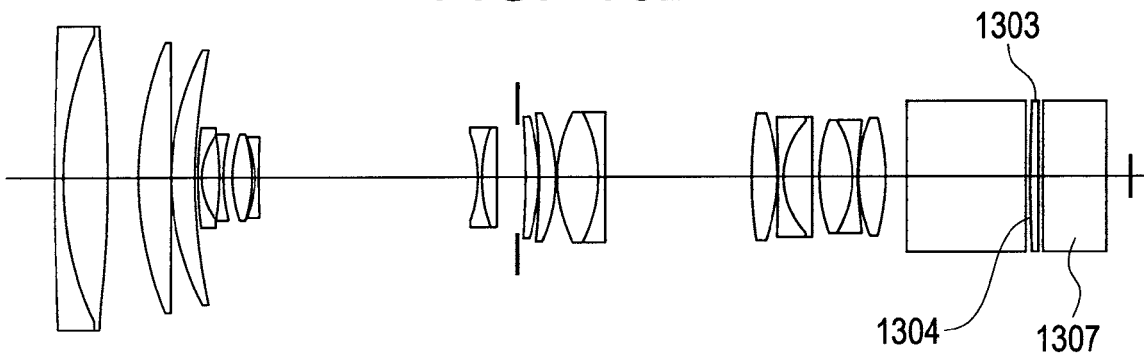
FIG. 15B is a lens cross-sectional view when the ND filter is inserted according to the sixth embodiment (second aspect).

FIGS. 15A and 15B illustrate lens cross-sectional views of the sixth embodiment. A camera optical system 1302 formed in the image pickup camera is arranged on the image plane side of a zoom lens 1301. The camera optical system 1302 includes a color separating optical system 1307 and an optical characteristic conversion filter such as an ND filter and a CC filter. An optical element 1303 that can be inserted and removed is arranged in the camera optical system. A surface 1304 on the object side of the optical element 1303 is a convex surface to have positive refractive index and is designed to prevent degradation in the spherical aberration caused by the insertion of the optical element 1303. The radius of curvature of the surface 1304 in the present embodiment is 700 mm, the thickness of the optical element 1303 is 2 mm, and the d-line refractive index N is 1.51633. The air-equivalent length X on the optical axis from the surface 1304 with positive refractive power to the image plane is 19.01 mm, and the open f-number is 1.85.

Table 2 illustrates numerical values related to the expressions (2) to (8). It can be recognized that the conditional expression (2) is satisfied and that the conditional expression (8) is further satisfied. In the present embodiment, X/Y=11.4.

An image pickup element 1305 as an image position correction unit that corrects the movement of the image forming position when the optical element is inserted is arranged in the camera optical system. When the optical element 1303 is inserted to the optical path, the optical element 1303 is shifted by 0.4 mm to the image side. As a result, the change in the image forming position caused by the insertion of the optical element 1303 is suppressed. The present embodiment includes a control unit that detects the state of the optical element 1303 in accordance with the insertion and removal from the optical path to drive the image position correction unit in the camera apparatus. In this way, the image position is corrected quickly in accordance with the insertion and removal of the optical element without the operator being conscious of the drive of the image position correction unit.

In the present embodiment, X/Y=11.4, and the convex surface of the inserted and removed optical element faces the object side.

Figure 16A:
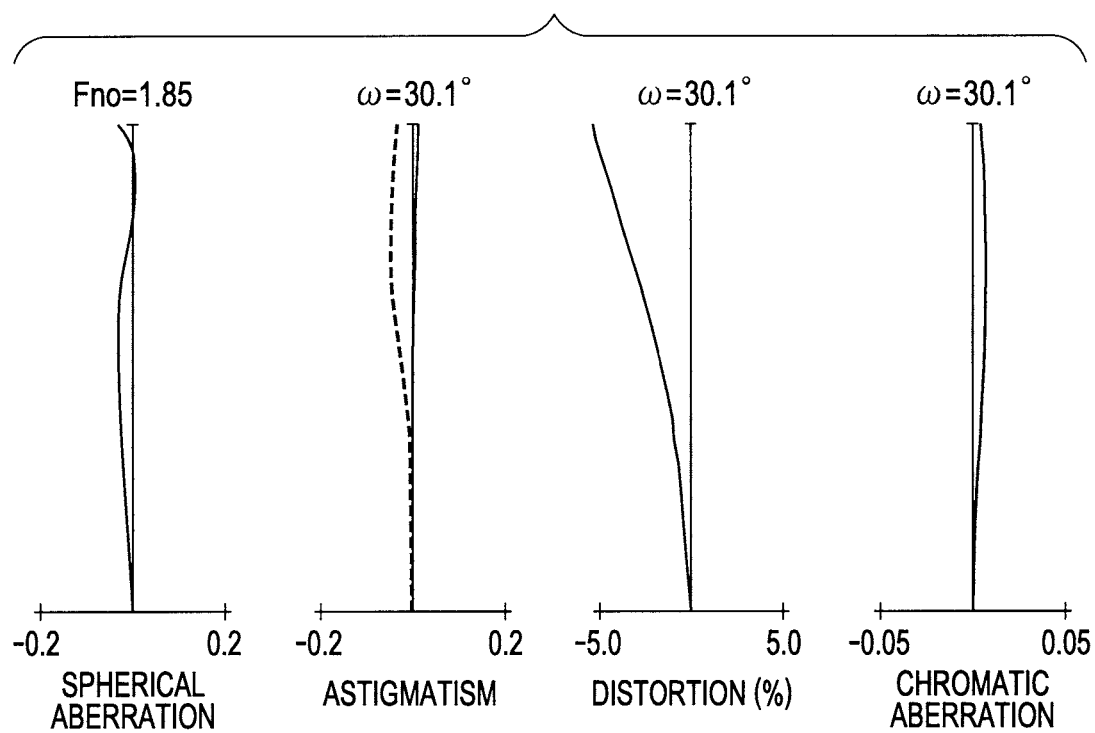
FIG. 16A illustrates a longitudinal aberration when the ND filter is removed according to the sixth embodiment (second aspect).
Figure 16B:
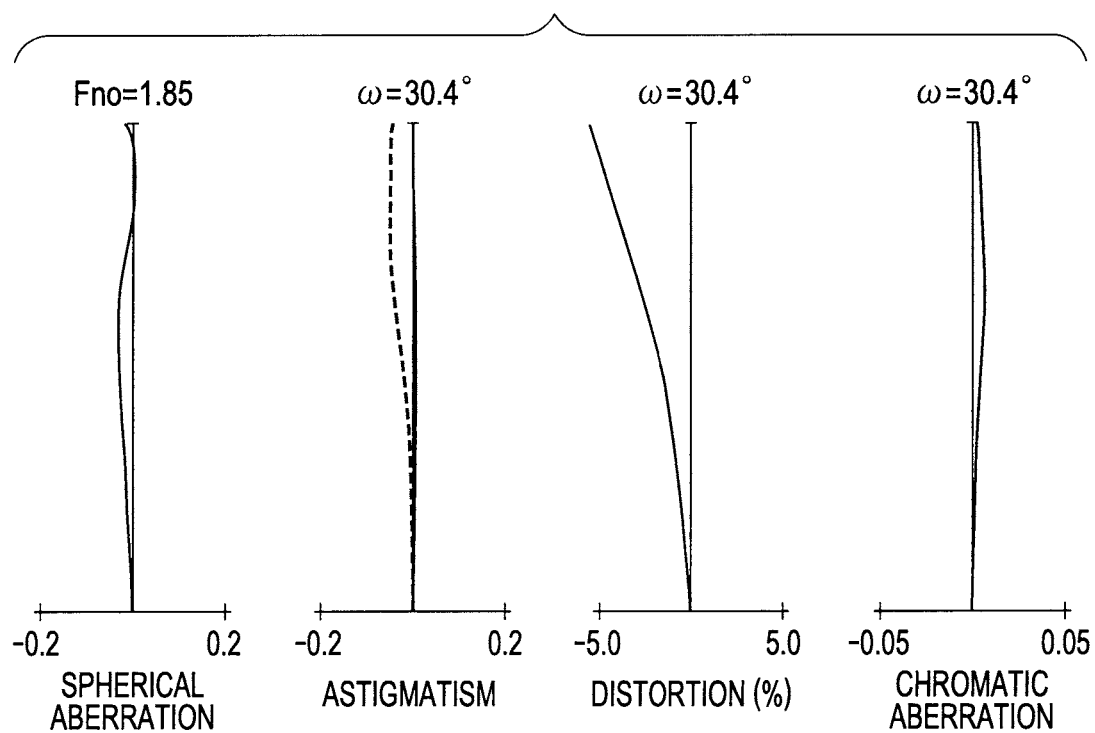
FIG. 16B illustrates a longitudinal aberration when the ND filter is inserted according to the sixth embodiment (second aspect).
Figure 17:
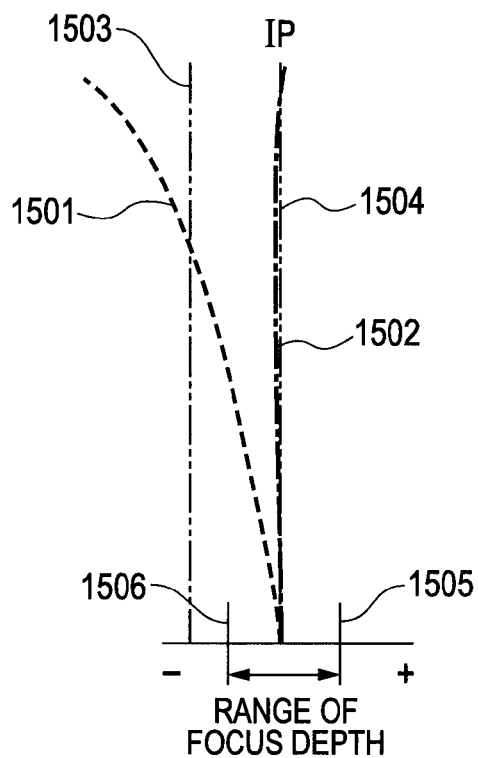
FIG. 17 is schematic diagram of a longitudinal aberration when an optical element with refractive power is inserted and removed according to a conventional example.
Figure 18:
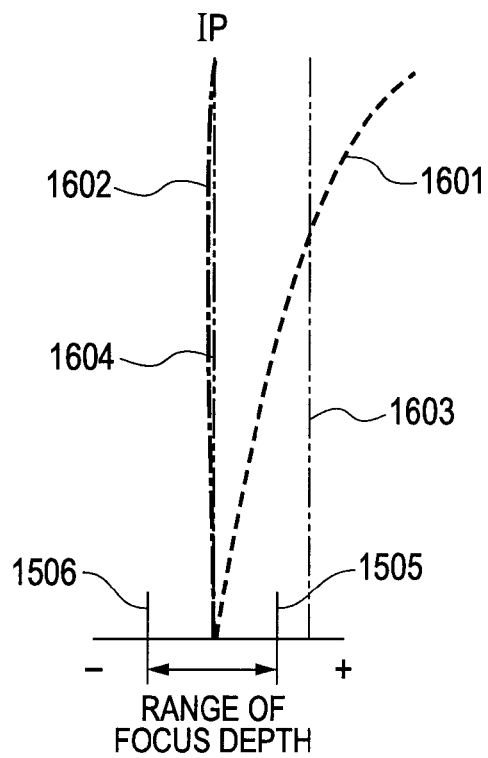
FIG. 18 is a schematic diagram of a longitudinal aberration when a parallel-plate optical element is inserted and removed according to the conventional example.

A fourth numerical embodiment describes numerical data of the optical system of the sixth embodiment. FIG. 16A illustrates a longitudinal aberration when the optical element is removed in the optical system of the present embodiment, and FIG. 16B illustrates a longitudinal aberration when the optical element is inserted in the optical system of the present embodiment. The surfaces 39 and 40 in the optical data when the optical element is removed are described only to facilitate the comparison with the inserted and removed optical element when the optical element is inserted, and nothing exists at the positions of the surfaces 39 and 40. Therefore, air exists between the surfaces 38 and 41, and the interval d is 4.0 mm.

The surface 1304 as the surface on the object side of the inserted optical element 1303 is formed by a convex surface to provide positive refractive power, and the radius of curvature satisfies the conditional expression (2) and further satisfies the conditional expression (8). In this way, the change in the spherical aberration caused by the insertion and removal of the optical element is suppressed.

Although the exemplary embodiments of the present invention have been described, the present invention is not limited to the embodiments, and various modifications and changes can be made within the scope of the present invention.

(First Numerical Embodiment Corresponding to First Embodiment)

Unit mm

| Surface Number | r | d | nd | vd | Effective Diameter |
|---|---|---|---|---|---|
| Surface Data | | | | | |
| 1 | −246.922 | 1.80 | 1.74950 | 35.3 | 81.77 |
| 2 | 232.273 | 6.64 | | | 80.57 |
| 3 | 465.881 | 0.00 | 1.80518 | 25.4 | 80.69 |
| 4 | 465.881 | 1.80 | 1.80518 | 25.4 | 80.69 |
| 5 | 122.384 | 13.88 | 1.60300 | 65.4 | 80.24 |
| 6 | −157.716 | 7.49 | | | 80.28 |
| 7 | 121.536 | 7.47 | 1.49700 | 81.5 | 76.64 |
| 8 | 4916.806 | 0.15 | | | 76.05 |
| 9 | 105.098 | 6.38 | 1.60300 | 65.4 | 71.99 |
| 10 | 482.600 | 0.15 | | | 71.09 |
| 11 | 69.519 | 5.86 | 1.72916 | 54.7 | 64.10 |
| 12 | 158.452 | (Variable) | | | 62.98 |
| 13* | 228.519 | 0.70 | 1.88300 | 40.8 | 28.56 |
| 14 | 16.094 | 5.93 | | | 23.07 |
| 15 | −123.223 | 6.59 | 1.80518 | 25.4 | 22.83 |
| 16 | −15.129 | 0.70 | 1.75500 | 52.3 | 22.47 |
| 17 | 30.692 | 0.68 | | | 20.60 |
| 18 | 23.413 | 0.00 | 1.60342 | 38.0 | 20.72 |
| 19 | 23.413 | 5.61 | 1.60342 | 38.0 | 20.72 |
| 20 | −39.635 | 0.88 | | | 20.14 |
| 21 | −24.853 | 0.00 | 1.83481 | 42.7 | 20.09 |
| 22 | −24.853 | 0.70 | 1.83481 | 42.7 | 20.09 |
| 23 | −134.691 | (Variable) | | | 20.06 |
| 24 | −28.312 | 0.70 | 1.74320 | 49.3 | 21.02 |
| 25 | 46.740 | 2.80 | 1.84666 | 23.8 | 23.02 |
| 26 | −2634.956 | (Variable) | | | 23.58 |
| 27(Stop) | ∞ | 1.30 | | | 27.17 |
| 28 | 360.024 | 4.38 | 1.65844 | 50.9 | 28.46 |
| 29 | −34.891 | 0.15 | | | 28.87 |
| 30 | 93.089 | 2.20 | 1.51633 | 64.1 | 29.44 |
| 31 | −3728.151 | 0.15 | | | 29.41 |
| 32 | 89.504 | 6.00 | 1.51633 | 64.1 | 29.35 |
| 33 | −32.080 | 1.80 | 1.83400 | 37.2 | 29.17 |
| 34 | −210.910 | 35.20 | | | 29.47 |
| 35 | 50.755 | 5.88 | 1.51633 | 64.1 | 29.42 |
| 36 | −53.480 | 1.67 | | | 29.24 |
| 37 | −77.656 | 1.80 | 1.83481 | 42.7 | 28.19 |
| 38 | 28.900 | 6.25 | 1.51742 | 52.4 | 27.79 |
| 39 | −88.443 | 4.17 | | | 28.05 |
| 40 | 86.742 | 6.93 | 1.48749 | 70.2 | 28.58 |
| 41 | −30.504 | 1.80 | 1.83400 | 37.2 | 28.45 |
| 42 | −143.178 | 0.18 | | | 29.16 |
| 43 | 52.448 | 4.90 | 1.51823 | 58.9 | 29.49 |
| 44 | −70.716 | 2.50 | | | 29.33 |
| Surface Data (Camera Optical System, When Optical Element Is Inserted) | | | | | |
| 45 | ∞ | 1.80 | 1.60342 | 38.0 | 40.00 |
| 46 | ∞ | 13.00 | 1.60342 | 38.0 | 40.00 |
| 47 | ∞ | 1.00 | | | 40.00 |
| 48 | 607.161 | 2.00 | 1.51633 | 64.1 | 40.00 |
| 49 | ∞ | 1.00 | | | 40.00 |
| 50 | ∞ | 17.00 | 1.60342 | 38.0 | 40.00 |
| 51 | ∞ | 16.20 | 1.51633 | 64.2 | 40.00 |
| 52 | ∞ | BF | | | 40.00 |
| Image plane | ∞ | | | | |
| Surface Data (Camera Optical System, When Optical Element Is Removed) | | | | | |
| 45 | ∞ | 1.80 | 1.60342 | 38.0 | 40.00 |
| 46 | ∞ | 13.00 | 1.60342 | 38.0 | 40.00 |
| 47 | ∞ | 1.00 | | | 40.00 |
| 48 | ∞ | 2.00 | | | 40.00 |
| 49 | ∞ | 1.00 | | | 40.00 |
| 50 | ∞ | 17.00 | 1.60342 | 38.0 | 40.00 |
| 51 | ∞ | 16.20 | 1.51633 | 64.2 | 40.00 |
| 52 | ∞ | BF | | | 40.00 |
| Image plane | ∞ | | | | |

Aspheric Data
Thirteenth Surface

K = 8.58860e+000  A4 = 7.05382e−006  A6 = −1.80303e−008
A8 = 7.49637e−011  A10 = −8.01854e−013  A12 = 5.80206e−015
A3 = −4.50041e−007  A5 = 1.66019e−008  A7 = −8.87373e−010
A9 = 1.99340e−011  A11 = −1.17115e−013

Various Data
Zoom Ratio 20.00

(When Optical Element Is Inserted)

| | | | | | |
|---|---|---|---|---|---|
| Focal Length | 8.00 | 16.01 | 32.50 | 106.73 | 160.09 |
| F-Number | 1.76 | 1.75 | 1.76 | 1.76 | 2.61 |
| Angle of Field | 34.49 | 18.96 | 9.61 | 2.95 | 1.97 |

(When Optical Element Is Removed)

| | | | | | |
|---|---|---|---|---|---|
| Focal Length | 8.20 | 16.40 | 33.29 | 109.33 | 164.00 |
| F-Number | 1.80 | 1.80 | 1.80 | 1.81 | 2.68 |
| Angle of Field | 33.85 | 18.54 | 9.38 | 2.88 | 1.92 |

(Common to When Optical Element Is Inserted and Removed)

| | | | | | |
|---|---|---|---|---|---|
| Image Height | 5.50 | 5.50 | 5.50 | 5.50 | 5.50 |
| Lens Length | 280.82 | 280.82 | 280.82 | 280.82 | 280.82 |
| BF | 4.38 | 4.38 | 4.38 | 4.38 | 4.38 |
| d12 | 0.66 | 22.07 | 36.64 | 50.54 | 53.04 |
| d23 | 55.23 | 30.79 | 13.88 | 3.50 | 5.98 |
| d26 | 4.40 | 7.43 | 9.77 | 6.25 | 1.28 |
| d50 | 4.38 | 4.38 | 4.38 | 4.38 | 4.38 |

(Second Numerical Embodiment Corresponding to Second Embodiment)

Unit mm

Surface Data

| Surface Number | r | d | nd | vd | Effective Diameter |
|---|---|---|---|---|---|
| 1 | −246.922 | 1.80 | 1.74950 | 35.3 | 81.77 |
| 2 | 232.273 | 6.64 | | | 80.57 |
| 3 | 465.881 | 0.00 | 1.80518 | 25.4 | 80.69 |
| 4 | 465.881 | 1.80 | 1.80518 | 25.4 | 80.69 |
| 5 | 122.384 | 13.88 | 1.60300 | 65.4 | 80.24 |
| 6 | −157.716 | 7.49 | | | 80.28 |
| 7 | 121.536 | 7.47 | 1.49700 | 81.5 | 76.64 |
| 8 | 4916.806 | 0.15 | | | 76.05 |
| 9 | 105.098 | 6.38 | 1.60300 | 65.4 | 71.99 |
| 10 | 482.600 | 0.15 | | | 71.09 |
| 11 | 69.519 | 5.86 | 1.72916 | 54.7 | 64.10 |
| 12 | 158.452 | (Variable) | | | 62.98 |
| 13* | 228.519 | 0.70 | 1.88300 | 40.8 | 28.56 |
| 14 | 16.094 | 5.93 | | | 23.07 |
| 15 | −123.223 | 6.59 | 1.80518 | 25.4 | 22.83 |
| 16 | −15.129 | 0.70 | 1.75500 | 52.3 | 22.47 |
| 17 | 30.692 | 0.68 | | | 20.60 |
| 18 | 23.413 | 0.00 | 1.60342 | 38.0 | 20.72 |
| 19 | 23.413 | 5.61 | 1.60342 | 38.0 | 20.72 |
| 20 | −39.635 | 0.88 | | | 20.14 |
| 21 | −24.853 | 0.00 | 1.83481 | 42.7 | 20.09 |
| 22 | −24.853 | 0.70 | 1.83481 | 42.7 | 20.09 |
| 23 | −134.691 | (Variable) | | | 20.06 |
| 24 | −28.312 | 0.70 | 1.74320 | 49.3 | 21.02 |
| 25 | 46.740 | 2.80 | 1.84666 | 23.8 | 23.02 |
| 26 | −2634.956 | (Variable) | | | 23.58 |
| 27(Stop) | ∞ | 1.30 | | | 27.17 |
| 28 | 360.024 | 4.38 | 1.65844 | 50.9 | 28.46 |
| 29 | −34.891 | 0.15 | | | 28.87 |
| 30 | 93.089 | 2.20 | 1.51633 | 64.1 | 29.44 |
| 31 | −3728.151 | 0.15 | | | 29.41 |
| 32 | 89.504 | 6.00 | 1.51633 | 64.1 | 29.35 |
| 33 | −32.080 | 1.80 | 1.83400 | 37.2 | 29.17 |
| 34 | −210.910 | 35.20 | | | 29.47 |
| 35 | 50.755 | 5.88 | 1.51633 | 64.1 | 29.42 |
| 36 | −53.480 | 1.67 | | | 29.24 |
| 37 | −77.656 | 1.80 | 1.83481 | 42.7 | 28.19 |
| 38 | 28.900 | 6.25 | 1.51742 | 52.4 | 27.79 |
| 39 | −88.443 | 4.17 | | | 28.05 |
| 40 | 86.742 | 6.93 | 1.48749 | 70.2 | 28.58 |
| 41 | −30.504 | 1.80 | 1.83400 | 37.2 | 28.45 |
| 42 | −143.178 | 0.18 | | | 29.16 |
| 43 | 52.448 | 4.90 | 1.51823 | 58.9 | 29.49 |
| 44 | −70.716 | 2.50 | | | 29.33 |

Surface Data (Camera Optical System, When Optical Element Is Inserted)

| 45 | ∞ | 1.82 | 1.60342 | 38.0 | 40.00 |
| 46 | ∞ | 13.00 | 1.60342 | 38.0 | 40.00 |
| 47 | ∞ | 1.00 | | | 40.00 |
| 48 | 625.000 | 2.00 | 1.51633 | 64.1 | 40.00 |
| 49 | ∞ | 1.00 | | | 40.00 |
| 50 | ∞ | 17.00 | 1.60342 | 38.0 | 40.00 |
| 51 | ∞ | 16.20 | 1.51633 | 64.2 | 40.00 |
| 52 | ∞ | BF | | | 40.00 |
| Image plane | ∞ | | | | |

Surface Data (Camera Optical System, When Optical Element Is Removed)

| 45 | ∞ | 1.82 | 1.60342 | 38.0 | 40.00 |
| 46 | ∞ | 13.00 | 1.60342 | 38.0 | 40.00 |
| 47 | ∞ | 1.00 | | | 40.00 |
| 48 | ∞ | 2.00 | | | 40.00 |
| 49 | ∞ | 1.00 | | | 40.00 |
| 50 | ∞ | 17.00 | 1.60342 | 38.0 | 40.00 |
| 51 | ∞ | 16.20 | 1.51633 | 64.2 | 40.00 |
| 52 | ∞ | BF | | | 40.00 |
| Image plane | ∞ | | | | |

Aspheric Data
Thirteenth Surface

K = 8.58860e+000   A4 = 7.05382e−006   A6 = −1.80303e−008
A8 = 7.49637e−011   A10 = −8.01854e−013   A12 = 5.80206e−015
A3 = −4.50041e−007   A5 = 1.66019e−008   A7 = −8.87373e−010
A9 = 1.99340e−011   A11 = −1.17115e−013

Various Data
Zoom Ratio 20.00

(When Optical Element Is Inserted)

| | | | | | |
|---|---|---|---|---|---|
| Focal Length | 8.01 | 16.02 | 32.52 | 106.80 | 160.20 |
| F-Number | 1.76 | 1.75 | 1.76 | 1.76 | 2.61 |
| Angle of Field | 34.48 | 18.95 | 9.60 | 2.95 | 1.97 |
| BF | 4.38 | 4.38 | 4.38 | 4.38 | 4.38 |

(When Optical Element Is Removed)

| | | | | | |
|---|---|---|---|---|---|
| Focal Length | 8.20 | 16.40 | 33.29 | 109.33 | 164.00 |
| F-Number | 1.80 | 1.80 | 1.80 | 1.81 | 2.68 |
| Angle of Field | 33.85 | 18.54 | 9.38 | 2.88 | 1.92 |
| BF | 4.36 | 4.36 | 4.36 | 4.36 | 4.36 |

(Common to When Optical Element Is Inserted and Removed)

| | | | | | |
|---|---|---|---|---|---|
| Image Height | 5.50 | 5.50 | 5.50 | 5.50 | 5.50 |
| Lens Length | 280.82 | 280.82 | 280.82 | 280.82 | 280.82 |
| d12 | 0.66 | 22.07 | 36.64 | 50.54 | 53.04 |
| d23 | 55.23 | 30.79 | 13.88 | 3.50 | 5.98 |
| d26 | 4.40 | 7.43 | 9.77 | 6.25 | 1.28 |
| d50 | 4.38 | 4.38 | 4.38 | 4.38 | 4.38 |

TABLE 1

| | First Embodiment | Second Embodiment |
|---|---|---|
| X | 210.3 mm | 211.3 mm |
| Y | 26.7 mm | 26.7 mm |
| X/Y | 7.9 | 7.9 |

(Third Numerical Embodiment Corresponding to Fifth Embodiment)

Unit mm

Surface Data (When Optical Element Is Removed)

| Surface Number | r | d | nd | vd |
|---|---|---|---|---|
| 1 | 600.261 | 2.20 | 1.75520 | 27.5 |
| 2 | 81.461 | 11.42 | 1.49700 | 81.6 |
| 3 | −290.956 | 7.63 | | |
| 4 | 86.701 | 7.86 | 1.62041 | 60.3 |
| 5 | 3044.710 | 0.15 | | |
| 6 | 66.016 | 6.01 | 1.72916 | 54.7 |
| 7 | 145.708 | (Variable) | | |
| 8 | 111.445 | 0.80 | 1.88300 | 40.8 |
| 9 | 16.812 | 4.65 | | |
| 10 | −47.842 | 0.70 | 1.81600 | 46.6 |
| 11 | 33.779 | 2.24 | | |
| 12 | 28.944 | 5.20 | 1.80518 | 25.4 |
| 13 | −29.192 | 0.54 | | |
| 14 | −24.664 | 0.70 | 1.78800 | 47.4 |
| 15 | 132.572 | (Variable) | | |
| 16 | −28.806 | 0.75 | 1.74320 | 49.3 |
| 17 | 37.218 | 3.81 | 1.84666 | 23.9 |
| 18 | 449.023 | (Variable) | | |
| 19(Stop) | ∞ | 1.80 | | |
| 20 | −231.233 | 3.33 | 1.67003 | 47.2 |
| 21 | −49.133 | 0.20 | | |
| 22 | −170.365 | 4.05 | 1.51742 | 52.4 |
| 23 | −38.625 | 0.20 | | |

-continued

Unit mm

| | | | | |
|---|---|---|---|---|
| 24 | 36.315 | 10.16 | 1.48749 | 70.2 |
| 25 | −35.564 | 1.66 | 1.83400 | 37.2 |
| 26 | ∞ | 36.00 | | |
| 27 | 97.385 | 6.35 | 1.50137 | 56.4 |
| 28 | −44.438 | 0.20 | | |
| 29 | −535.653 | 1.40 | 1.83400 | 37.2 |
| 30 | 21.016 | 7.22 | 1.50137 | 56.4 |
| 31 | −424.093 | 1.50 | | |
| 32 | 38.505 | 8.29 | 1.51823 | 58.9 |
| 33 | −27.482 | 1.40 | 1.77250 | 49.6 |
| 34 | 91.360 | 0.30 | | |
| 35 | 38.442 | 6.84 | 1.53172 | 48.8 |
| 36 | −52.407 | 5.00 | | |
| 37 | ∞ | 30.00 | 1.60342 | 38.0 |
| 38 | ∞ | 1.00 | | |
| 39 | ∞ | 2.00 | | |
| 40 | ∞ | 1.00 | | |
| 41 | ∞ | 16.20 | 1.51633 | 64.2 |
| 42 | ∞ | (Variable) | | |
| Image plane | ∞ | | | |

Surface Data (When Optical Element Is Inserted)

| | | | | |
|---|---|---|---|---|
| 1 | 600.261 | 2.20 | 1.75520 | 27.5 |
| 2 | 81.461 | 11.42 | 1.49700 | 81.6 |
| 3 | −290.956 | 7.63 | | |
| 4 | 86.701 | 7.86 | 1.62041 | 60.3 |
| 5 | 3044.710 | 0.15 | | |
| 6 | 66.016 | 6.01 | 1.72916 | 54.7 |
| 7 | 145.708 | (Variable) | | |
| 8 | 111.445 | 0.80 | 1.88300 | 40.8 |
| 9 | 16.812 | 4.65 | | |
| 10 | −47.842 | 0.70 | 1.81600 | 46.6 |
| 11 | 33.779 | 2.24 | | |
| 12 | 28.944 | 5.20 | 1.80518 | 25.4 |
| 13 | −29.192 | 0.54 | | |
| 14 | −24.664 | 0.70 | 1.78800 | 47.4 |
| 15 | 132.572 | (Variable) | | |
| 16 | −28.806 | 0.75 | 1.74320 | 49.3 |
| 17 | 37.218 | 3.81 | 1.84666 | 23.9 |
| 18 | 449.023 | (Variable) | | |
| 19(Stop) | ∞ | 1.80 | | |
| 20 | −231.233 | 3.33 | 1.67003 | 47.2 |
| 21 | −49.133 | 0.20 | | |
| 22 | −170.365 | 4.05 | 1.51742 | 52.4 |
| 23 | −38.625 | 0.20 | | |
| 24 | 36.315 | 10.16 | 1.48749 | 70.2 |
| 25 | −35.564 | 1.66 | 1.83400 | 37.2 |
| 26 | ∞ | 35.59 | | |
| 27 | 97.385 | 6.35 | 1.50137 | 56.4 |
| 28 | −44.438 | 0.20 | | |
| 29 | −535.653 | 1.40 | 1.83400 | 37.2 |
| 30 | 21.016 | 7.22 | 1.50137 | 56.4 |
| 31 | −424.093 | 1.50 | | |
| 32 | 38.505 | 8.29 | 1.51823 | 58.9 |
| 33 | −27.482 | 1.40 | 1.77250 | 49.6 |
| 34 | 91.360 | 0.30 | | |
| 35 | 38.442 | 6.84 | 1.53172 | 48.8 |
| 36 | −52.407 | 5.41 | | |
| 37 | ∞ | 30.00 | 1.60342 | 38.0 |
| 38 | ∞ | 1.00 | | |
| 39* | 700.000 | 2.00 | 1.51633 | 64.2 |
| 40* | ∞ | 1.00 | | |
| 41 | ∞ | 16.20 | 1.51633 | 64.2 |
| 42 | ∞ | (Variable) | | |
| Image plane | ∞ | | | |

Various Data
Zoom Ratio 19.50

| | | | | | |
|---|---|---|---|---|---|
| Focal Length (When Optical Element Is Removed) | 9.50 | 15.20 | 38.86 | 91.50 | 185.29 |
| Focal Length (When Optical Element Is Inserted) | 9.37 | 14.99 | 38.31 | 90.20 | 182.65 |
| F-Number (When Optical Element Is Removed) | 1.85 | 1.85 | 1.85 | 1.85 | 2.85 |
| F-Number (When Optical Element Is Inserted) | 1.85 | 1.85 | 1.85 | 1.85 | 2.81 |
| Angle of Field (When Optical Element Is Removed) | 30.06 | 19.89 | 8.06 | 3.44 | 1.70 |
| Angle of Field (When Optical Element Is Inserted) | 30.42 | 20.15 | 8.17 | 3.49 | 1.72 |
| Image Height | 5.50 | 5.50 | 5.50 | 5.50 | 5.50 |
| Lens Length | 266.06 | 266.06 | 266.06 | 266.06 | 266.06 |
| BF | 6.02 | 6.02 | 6.02 | 6.02 | 6.02 |
| d7 | 0.65 | 15.69 | 35.96 | 46.91 | 52.03 |
| d15 | 53.75 | 36.74 | 13.38 | 3.88 | 6.32 |
| d18 | 5.10 | 7.07 | 10.15 | 8.71 | 1.15 |
| d43 | 7.80 | 7.80 | 7.80 | 7.80 | 7.80 |

*Surfaces 39 and 40 are inserted and removed optical elements.

(Fourth Numerical Embodiment Corresponding to Sixth Embodiment)

Unit mm

| Surface Number | r | d | nd | vd |
|---|---|---|---|---|

Surface Data (When Optical Element Is Removed)

| | | | | |
|---|---|---|---|---|
| 1 | 600.261 | 2.20 | 1.75520 | 27.5 |
| 2 | 81.461 | 11.42 | 1.49700 | 81.6 |
| 3 | −290.956 | 7.63 | | |
| 4 | 86.701 | 7.86 | 1.62041 | 60.3 |
| 5 | 3044.710 | 0.15 | | |
| 6 | 66.016 | 6.01 | 1.72916 | 54.7 |
| 7 | 145.708 | (Variable) | | |
| 8 | 111.445 | 0.80 | 1.88300 | 40.8 |
| 9 | 16.812 | 4.65 | | |
| 10 | −47.842 | 0.70 | 1.81600 | 46.6 |
| 11 | 33.779 | 2.24 | | |
| 12 | 28.944 | 5.20 | 1.80518 | 25.4 |
| 13 | −29.192 | 0.54 | | |
| 14 | −24.664 | 0.70 | 1.78800 | 47.4 |
| 15 | 132.572 | (Variable) | | |
| 16 | −28.806 | 0.75 | 1.74320 | 49.3 |
| 17 | 37.218 | 3.81 | 1.84666 | 23.9 |
| 18 | 449.023 | (Variable) | | |
| 19(Stop) | ∞ | 1.80 | | |
| 20 | −231.233 | 3.33 | 1.67003 | 47.2 |
| 21 | −49.133 | 0.20 | | |
| 22 | −170.365 | 4.05 | 1.51742 | 52.4 |
| 23 | −38.625 | 0.20 | | |
| 24 | 36.315 | 10.16 | 1.48749 | 70.2 |
| 25 | −35.564 | 1.66 | 1.83400 | 37.2 |
| 26 | ∞ | 36.00 | | |
| 27 | 97.385 | 6.35 | 1.50137 | 56.4 |
| 28 | −44.438 | 0.20 | | |
| 29 | −535.653 | 1.40 | 1.83400 | 37.2 |
| 30 | 21.016 | 7.22 | 1.50137 | 56.4 |
| 31 | −424.093 | 1.50 | | |
| 32 | 38.505 | 8.29 | 1.51823 | 58.9 |
| 33 | −27.482 | 1.40 | 1.77250 | 49.6 |
| 34 | 91.360 | 0.30 | | |
| 35 | 38.442 | 6.84 | 1.53172 | 48.8 |
| 36 | −52.407 | 5.00 | | |
| 37 | ∞ | 30.00 | 1.60342 | 38.0 |
| 38 | ∞ | 1.00 | | |
| 39 | ∞ | 2.00 | | |
| 40 | ∞ | 1.00 | | |
| 41 | ∞ | 16.20 | 1.51633 | 64.2 |
| 42 | ∞ | (Variable) | | |
| Image plane | ∞ | | | |

-continued

Unit mm

Surface Data (Camera Optical System, When Optical Element Is Inserted)

| | | | | |
|---|---|---|---|---|
| 1 | 600.261 | 2.20 | 1.75520 | 27.5 |
| 2 | 81.461 | 11.42 | 1.49700 | 81.6 |
| 3 | −290.956 | 7.63 | | |
| 4 | 86.701 | 7.86 | 1.62041 | 60.3 |
| 5 | 3044.710 | 0.15 | | |
| 6 | 66.016 | 6.01 | 1.72916 | 54.7 |
| 7 | 145.708 | (Variable) | | |
| 8 | 111.445 | 0.80 | 1.88300 | 40.8 |
| 9 | 16.812 | 4.65 | | |
| 10 | −47.842 | 0.70 | 1.81600 | 46.6 |
| 11 | 33.779 | 2.24 | | |
| 12 | 28.944 | 5.20 | 1.80518 | 25.4 |
| 13 | −29.192 | 0.54 | | |
| 14 | −24.664 | 0.70 | 1.78800 | 47.4 |
| 15 | 132.572 | (Variable) | | |
| 16 | −28.806 | 0.75 | 1.74320 | 49.3 |
| 17 | 37.218 | 3.81 | 1.84666 | 23.9 |
| 18 | 449.023 | (Variable) | | |
| 19(Stop) | ∞ | 1.80 | | |
| 20 | −231.233 | 3.33 | 1.67003 | 47.2 |
| 21 | −49.133 | 0.20 | | |
| 22 | −170.365 | 4.05 | 1.51742 | 52.4 |
| 23 | −38.625 | 0.20 | | |
| 24 | 36.315 | 10.16 | 1.48749 | 70.2 |
| 25 | −35.564 | 1.66 | 1.83400 | 37.2 |
| 26 | ∞ | 36.00 | | |
| 27 | 97.385 | 6.35 | 1.50137 | 56.4 |
| 28 | −44.438 | 0.20 | | |
| 29 | −535.653 | 1.40 | 1.83400 | 37.2 |
| 30 | 21.016 | 7.22 | 1.50137 | 56.4 |
| 31 | −424.093 | 1.50 | | |
| 32 | 38.505 | 8.29 | 1.51823 | 58.9 |
| 33 | −27.482 | 1.40 | 1.77250 | 49.6 |
| 34 | 91.360 | 0.30 | | |
| 35 | 38.442 | 6.84 | 1.53172 | 48.8 |
| 36 | −52.407 | 5.00 | | |
| 37 | ∞ | 30.00 | 1.60342 | 38.0 |
| 38 | ∞ | 1.00 | | |
| 39* | 700.000 | 2.00 | 1.51633 | 64.2 |
| 40* | ∞ | 1.00 | | |
| 41 | ∞ | 16.20 | 1.51633 | 64.2 |
| 42 | ∞ | (Variable) | | |
| Image plane | ∞ | | | |

Various Data
Zoom Ratio 19.50

| | | | | | |
|---|---|---|---|---|---|
| Focal Length (When Optical Element Is Removed) | 9.50 | 15.20 | 38.86 | 91.50 | 185.29 |
| Focal Length (When Optical Element Is Inserted) | 9.37 | 14.98 | 38.30 | 90.19 | 182.62 |
| F-Number (When Optical Element Is Removed) | 1.85 | 1.85 | 1.85 | 1.85 | 2.85 |
| F-Number (When Optical Element Is Inserted) | 1.85 | 1.85 | 1.85 | 1.85 | 2.81 |
| Angle of Field (When Optical Element Is Removed) | 30.06 | 19.89 | 8.06 | 3.44 | 1.70 |
| Angle of Field (When Optical Element Is Inserted) | 30.42 | 20.16 | 8.17 | 3.49 | 1.73 |
| Image Height | 5.50 | 5.50 | 5.50 | 5.50 | 5.50 |
| Lens Length | 266.06 | 266.06 | 266.06 | 266.06 | 266.06 |
| BF (When Optical Element Is Removed) | 6.02 | 6.02 | 6.02 | 6.02 | 6.02 |
| BF (When Optical Element Is Inserted) | 6.42 | 6.42 | 6.42 | 6.42 | 6.42 |
| d7 | 0.65 | 15.69 | 35.96 | 46.91 | 52.03 |
| d15 | 53.75 | 36.74 | 13.38 | 3.88 | 6.32 |
| d18 | 5.10 | 7.07 | 10.15 | 8.71 | 1.15 |
| d43 | 7.80 | 7.80 | 7.80 | 7.80 | 7.80 |

*Surfaces 39 and 40 are inserted and removed optical elements.

TABLE 2

| | Fifth Embodiment | Sixth Embodiment |
|---|---|---|
| d | 2 mm | 2 mm |
| N | 1.51633 | 1.51633 |
| κ | 19.01 | 19.01 |
| F | 1.85 | 1.85 |
| SA | 0.02937 | 0.02937 |
| H | 5.13784 | 5.13784 |
| A | 0.01133 | 0.01133 |
| B | 0.02195 | 0.02195 |
| R | 601.35202 | 601.35202 |
| r/R | 1.16404 | 1.16404 |
| X | 307.3 mm | 307.3 mm |
| Y | 27.0 mm | 27.0 mm |
| X/Y | 11.4 | 11.4 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-089688, filed on Apr. 14, 2011, and Japanese Patent Application No. 2011-089692, filed on Apr. 14, 2011 which are hereby incorporated by reference herein in their entirety.

What is claimed is:

1. An image pickup apparatus comprising:
    a lens apparatus; and
    a camera apparatus that can be attached and removed from the lens apparatus, wherein the camera apparatus comprises:
    an image pickup element;
    an optical length adjustment unit configured to increase an optical length; and
    an optical element configured to be inserted and removed from an optical path,
    the optical element is a Neutral Density filter (ND filter),
    wherein the ND filter has a surface with positive refractive power, and
    wherein the following condition is satisfied, $0.6 < D1/D2 < 1.3$ where $D1$ denotes a thickness of the ND filter on an optical axis and $D2$ denotes a thickness of the optical length adjustment unit on the optical axis.

2. The image pickup apparatus according to claim 1, further comprising
    a color separating optical system between the image pickup element and the optical element on the optical path, wherein
    the optical length adjustment unit is arranged separately from the color separating optical system.

3. The image pickup apparatus according to claim 2, wherein
    the optical length adjustment unit can be attached and removed from the optical path.

4. The image pickup apparatus according to claim 1, further comprising a color separating optical system between the image pickup element and the optical element on the optical path, wherein
the optical length adjustment unit is arranged integrally with the optical separating optical system.

5. The image pickup apparatus according to claim 1, wherein
paraxial focal points when the ND filter is inserted to the optical path and when the ND filter is removed from the optical path are the same.

6. The image pickup apparatus according to claim 1, wherein
the paraxial focal point when the ND filter is inserted is on an opposite side of an object side of an image plane of the image pickup element, and the paraxial focal point when the ND filter is removed is on the object side of the image plane.

7. The image pickup apparatus according to claim 1, wherein the surface with the positive refractive power of the ND filter is formed on the object side if $(X/Y) \geq 0$ or if $(X/Y) < 0$ and $|X| \geq |Y|$, and the surface is formed on an image side if $(X/Y) < 0$ and $|X| < |Y|$, where X denotes a distance on the optical axis from the surface with the positive refractive power of the ND filter to an apparent exit pupil and Y denotes a distance on the optical axis from the surface with the positive refractive power of the ND filter to an apparent image plane, wherein signs for X and Y are defined as that the image side of the ND filter is positive, and the object side of the ND filter is negative.

8. An image pickup apparatus comprising:
a lens apparatus; and
a camera apparatus that can be attached and removed from the lens apparatus,
wherein the camera apparatus comprises: an image pickup element; and an optical element configured to be inserted and removed from an optical path,
wherein the optical element is a Neutral Density filter (ND filter), and the ND filter has a surface with positive refractive power, and
wherein the following condition is satisfied, $$0.5 < \frac{r}{R} < 1.5$$

where r denotes a radius of curvature of the surface with positive refractive power and R is defined by the following expressions, $$SA = \frac{d}{2} \times \frac{N^2 - 1}{N^3} \times \frac{1}{4 \times F^2 - 1}$$

$$H = \frac{K}{2 \times F}$$

$$A = \sqrt{(K + SA)^2 - H^2} - \sqrt{K^2 - H^2} - SA$$

$$B = \frac{A}{N - 1} \times 10$$

$$R = \frac{B^2 + H^2}{2 \times B}$$

where d denotes a thickness of the ND filter, N denotes a refractive index in a d-line of the ND filter, K denotes an air-equivalent length on the optical axis from the image plane of the image pickup element to the surface with the positive refractive power, and F denotes an f- number of the entire optical system of the image pickup apparatus.

9. The image pickup apparatus according to claim 8, further comprising
an image position correction unit configured to correct a movement of an image forming position caused by insertion and removal of the ND filter from the optical path, wherein
the image position correction unit is formed in the lens apparatus.

10. The image pickup apparatus according to claim 9, further comprising
a control unit configured to drive the image position correction unit when the ND filter is inserted to the optical path.

11. The image pickup apparatus according to claim 8, further comprising
an image position correction unit configured to correct a movement of the image forming position caused by insertion and removal of the ND filter from the optical path, wherein
the image position correction unit is formed in the camera apparatus.

12. The image pickup apparatus according to claim 11, further comprising
a control unit configured to drive the image position correction unit when the ND filter is inserted to the optical path.

13. The image pickup apparatus according to claim 8, wherein
the surface with the positive refractive power of the ND filter is formed on the object side if $(X/Y) \geq 0$ or if $(X/Y) < 0$ and $|X| \geq |Y|$, and the surface is formed on an image side if $(X/Y) < 0$ and $|X| < |Y|$, where X denotes a distance on the optical axis from the surface with the positive refractive power of the ND filter to an apparent exit pupil and Y denotes a distance on the optical axis from the surface with the positive refractive power of the ND filter to an apparent image plane, wherein signs for X and Y are defined as that the image side of the ND filter is positive, and the object side of the ND filter is negative.

14. An image pickup apparatus comprising:
a lens apparatus; and
a camera apparatus that can be attached and removed from the lens apparatus,
wherein the camera apparatus comprises:
an image pickup element; and
an optical element configured to be inserted and removed from an optical path, wherein the optical element is a Neutral Density filter (ND filter), and the ND filter has a surface with positive refractive power, wherein the surface with the positive refractive power of the ND filter is formed on the object side if (X/Y)≥0 or if (X/Y)<0 and |X|≥|Y|, and the surface is formed on an image side if (X/Y)<0 and |X|<|Y|, where X denotes a distance on the optical axis from the surface with the positive refractive power of the ND filter to an apparent exit pupil and Y denotes a distance on the optical axis from the surface with the positive refractive power of the ND filter to an apparent image plane, wherein signs for X and Y are defined as that the image side of the ND filter is positive, and the object side of the ND filter is negative.

15. The image pickup apparatus according to claim 14, wherein
the camera apparatus comprises an optical length adjustment unit configured to increase an optical length.

16. The image pickup apparatus according to claim 14, further comprising
a color separating optical system between the image pickup element and the optical element on the optical path, wherein
the optical length adjustment unit is arranged separately from the color separating optical system.

17. The image pickup apparatus according to claim 14, further comprising
a color separating optical system between the image pickup element and the optical element on the optical path, wherein
the optical length adjustment unit is arranged integrally with the optical separating optical system.

18. The image pickup apparatus according to claim 14, wherein
paraxial focal points when the ND filter is inserted to the optical path and when the ND filter is removed from the optical path are the same.

19. The image pickup apparatus according to claim 14, wherein
the paraxial focal point when the ND filter is inserted is on an opposite side of an object side of an image plane of the image pickup element, and the paraxial focal point when the ND filter is removed is on the object side of the image plane.

* * * * *